(12) United States Patent
Maguire et al.

(10) Patent No.: US 11,541,861 B2
(45) Date of Patent: Jan. 3, 2023

(54) TRANSMISSION SYSTEM FOR USE IN A VEHICLE

(71) Applicant: BorgWarner Inc., Auburn Hills, MI (US)

(72) Inventors: Joel Maguire, Hartland, MI (US); R. Keith Martin, Marlette, MI (US); Christopher Spangler, Rochester Hills, MI (US); Keith Van Maanen, Bloomfield Hills, MI (US); Thomas J. Foster, Troy, MI (US); Mark Buchanan, Rochester Hills, MI (US)

(73) Assignee: BorgWarner Inc., Auburn Hills, MI (US)

(*) Notice: Subject to any disclaimer, the term of this patent is extended or adjusted under 35 U.S.C. 154(b) by 223 days.

(21) Appl. No.: 16/856,296

(22) Filed: Apr. 23, 2020

(65) Prior Publication Data

US 2020/0346631 A1 Nov. 5, 2020

Related U.S. Application Data

(60) Provisional application No. 62/840,872, filed on Apr. 30, 2019.

(51) Int. Cl.
*F16H 3/091* (2006.01)
*B60W 10/11* (2012.01)
(Continued)

(52) U.S. Cl.
CPC .............. *B60W 10/11* (2013.01); *B60K 6/24* (2013.01); *B60K 6/26* (2013.01); *B60K 6/36* (2013.01);
(Continued)

(58) Field of Classification Search
CPC .......... F16H 3/091; B60W 10/11; B60K 6/26; B60K 6/36; B60K 6/38; B60K 6/46
(Continued)

(56) References Cited

U.S. PATENT DOCUMENTS 5,943,918 A * 8/1999 Reed, Jr. ............... B60W 10/08
192/219.5
9,822,860 B2 * 11/2017 Kaltenbach .............. B60K 1/00
(Continued)

FOREIGN PATENT DOCUMENTS

CN 106627078 A * 5/2017 ............... B60K 1/02
CN 10785652 A 3/2018
(Continued)

OTHER PUBLICATIONS

English language abstract and machine-assisted English translation for CN 107856526 extracted from espacenet.com database on Jun. 22, 2020, 8 pages.
(Continued)

*Primary Examiner* — Ha Dinh Ho
(74) *Attorney, Agent, or Firm* — Howard & Howard Attorneys PLLC

(57) ABSTRACT

A transmission system includes a transmission housing and a countershaft having no less than two gears, with the gears defining a plurality of gear ratios. The transmission system also includes a module housing, a first output shaft rotatably coupled to the countershaft, and a second output shaft rotatably coupled to the countershaft. The transmission system further includes a first clutch configured to selectively rotatably couple the first output shaft to the countershaft. The transmission system also includes a second clutch configured to selectively rotatably couple the second output shaft to the countershaft. The transmission system further includes an electric machine configured to deliver rotational (Continued)

power to at least one of the first and second output shafts to deliver rotational power to the countershaft. The countershaft is rotatably coupled to either of the first and second output shafts for all of the gear ratios.

17 Claims, 25 Drawing Sheets

(51) Int. Cl.
*B60K 6/26* (2007.10)
*B60K 6/36* (2007.10)
*B60K 6/38* (2007.10)
*B60K 6/46* (2007.10)
*B60K 6/24* (2007.10)
*B60W 10/02* (2006.01)

(52) U.S. Cl.
CPC .................. *B60K 6/38* (2013.01); *B60K 6/46* (2013.01); *B60W 10/02* (2013.01); *F16H 3/091* (2013.01); *B60Y 2200/92* (2013.01)

(58) Field of Classification Search
USPC .......................................................... 74/661
See application file for complete search history.

(56) References Cited

U.S. PATENT DOCUMENTS

| | | | | |
|---|---|---|---|---|
| 11,052,749 | B2 * | 7/2021 | Yu | B60K 6/547 |
| 11,162,562 | B2 * | 11/2021 | Yu | B60K 17/22 |
| 2012/0006153 | A1 * | 1/2012 | Imamura | B60W 20/30 74/665 A |
| 2014/0033844 | A1 * | 2/2014 | Rothvoss | F16H 3/16 74/335 |
| 2016/0325614 | A1 * | 11/2016 | Yang | B60K 6/44 |
| 2019/0017572 | A1 * | 1/2019 | Yu | F16H 57/023 |
| 2019/0359045 | A1 * | 11/2019 | Yu | B60K 1/02 |
| 2019/0366822 | A1 * | 12/2019 | Yu | B60K 1/02 |
| 2020/0240493 | A1 * | 7/2020 | Yu | F16H 57/023 |

FOREIGN PATENT DOCUMENTS

| | | |
|---|---|---|
| CN | 107856526 | 3/2018 |
| CN | 108422852 | 8/2018 |
| CN | 108422852 A | 8/2018 |
| DE | 10 2017 216 511 | 3/2018 |
| DE | 102017216511 A1 | 3/2018 |
| DE | 10 2009 038 344 | 2/2019 |
| DE | 102009038344 B4 | 2/2019 |
| KR | 2016-0149370 | 12/2016 |
| KR | 20160149370 A | 12/2016 |
| WO | 2018093108 A1 | 5/2018 |
| WO | WO 2018/093108 | 5/2018 |
| WO | 2018153399 A1 | 8/2018 |
| WO | WO 2018/153399 | 8/2018 |
| WO | 2018171830 A1 | 9/2018 |
| WO | WO 2018/171830 | 9/2018 |
| WO | 2019024956 A1 | 2/2019 |
| WO | WO 2019/024956 | 2/2019 |

OTHER PUBLICATIONS

English language abstract and machine-assisted English translation for CN 108422852 extracted from espacenet.com database on Jun. 22, 2020, 9 pages.
Machine-assisted English language abstract and machine-assisted English translation for DE 10 2017 216 511 extracted from espacenet. com database on Jun. 22, 2020, 16 pages.
English language abstract and machine-assisted English translation for DE 10 2009 038 344 extracted from espacenet.com database on Jun. 22, 2020, 10 pages.
English language abstract and machine-assisted English translation for KR 2016-0149370 extracted from espacenet.com database on Jun. 22, 2020, 7 pages.
English language abstract and machine-assisted English translation for WO 2018/093108 extracted from espacenet.com database on Jun. 22, 2020, 22 pages.
English language abstract and machine-assisted English translation for WO 2018/153399 extracted from espacenet.com database on Jun. 22, 2020, 17 pages.
English language abstract and machine-assisted English translation for WO 2018/171830 extracted from espacenet.com database on Jun. 22, 2020, 9 pages.
English language abstract and machine-assisted English translation for WO 2019/024956 extracted from espacenet.com database on Jun. 22, 2020, 10 pages.

* cited by examiner

|  | 0<20 | 20-50 | >50 | Highway |
|---|---|---|---|---|
| Mode | Series | Series | Series | Parallel |
| Gen (~100kW) | X | X | X | X |
| Motor (~100kW) | X | X | X | X |
| K0 | Open | Open | Open | Closed |
| GR1 | X | X | X | X |
|  | Eff<90% | Eff<90% | Eff<90% | Eff>90% |

| | 0<20 | 20-50 | >50 | Highway | |
|---|---|---|---|---|---|
| Mode | Series | Parallel Series | Series | Parallel | |
| Gen (~100kW) | X | X | X | X | |
| Motor (~100kW) | X | X | X | X | |
| K0 | Open | Closed | Open | Closed | |
| GR1-CL | X | X<br>—OR— | X<br>—OR— | | |
| GR2-CH | | X | X | X | |
| | Eff<90% | Eff>90% | Eff>90% | Eff>90% | |

|  | Twin Drive | Trio-Drive |
|---|---|---|
| Launch (<20kph) | Series | Series |
| Urban Low speed (20-50kph) | Only Series | Series or parallel (Gr1), ICE Gr1 |
| Urban (>50kph) | Series or Parallel or ICE | Series or Parallel (Gr1 or Gr2), ICE (Gr1 or Gr2) |
| Highway | Parallel | Series (Gr2) or Parallel (Gr2) |
| BEV | 1 gear direct | 2 gear ratios available with Power On Shifting |
| Mfg Capital | All new | Carry over |
| Engineering Capital | All new | Carry over (P2 and DCT) |

FIG. 25

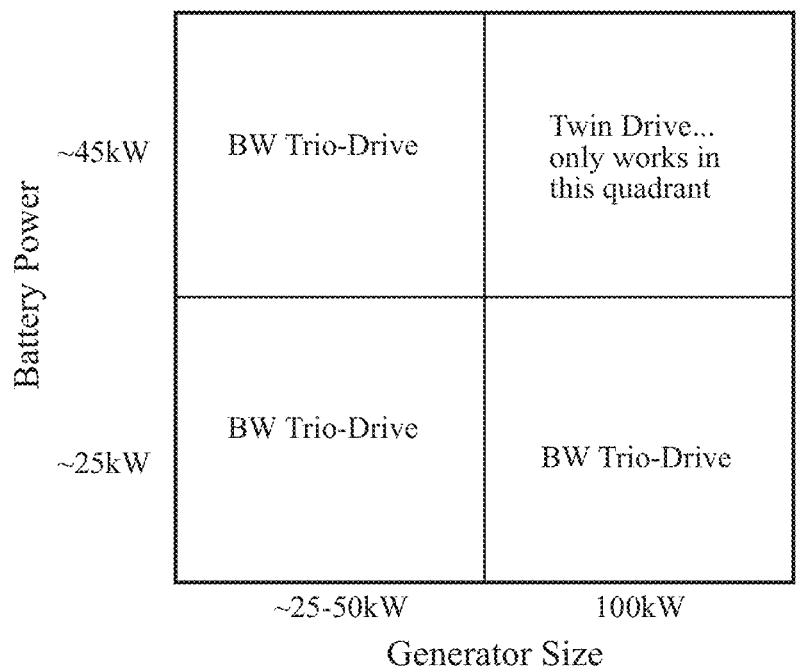

FIG. 26

TRANSMISSION SYSTEM FOR USE IN A VEHICLE

CROSS-REFERENCE TO RELATED APPLICATIONS

The subject patent application claims priority to and all the benefits of U.S. Provisional Patent Application No. 62/840,872 filed on Apr. 30, 2019, the disclosure of which is herein incorporated by reference in its entirety.

BACKGROUND

1. Field of the Disclosure

The present disclosure generally relates to a transmission system for use in a vehicle, and a method of controlling the transmission system.

2. Description of the Related Art

Conventional vehicles include an internal combustion engine and a transmission system for delivering rotational power to wheels of the vehicle. In recent years, there has been a desire to improve fuel efficiency of vehicles.

To accomplish this, some vehicles in recent years include an electric motor that is also able to deliver rotational power to the wheels of the vehicle. Such a vehicle is generally referred to as a hybrid vehicle. Although hybrid vehicles typically have improved fuel efficiency when compared to conventional vehicles, hybrid vehicles and, specifically, transmission systems of hybrid vehicles, often cost more money, require increased engineering design cost, and increase weight of the hybrid vehicle.

As such, there remains a need to provide an improved transmission system for use in a vehicle.

SUMMARY OF THE INVENTION AND ADVANTAGES

A transmission system for use in a vehicle includes a transmission housing and a countershaft having no less than two gears, with the gears defining a plurality of gear ratios. The transmission system also includes a module housing coupled to the transmission housing, with the module housing defining a module housing interior. The transmission system additionally includes a first output shaft rotatably coupled to the countershaft, and a second output shaft rotatably coupled to the countershaft. The transmission system further includes a first clutch disposed in the module housing interior, with the first clutch being configured to selectively rotatably couple the first output shaft to the countershaft to deliver rotational power to the countershaft. The transmission system also includes a second clutch disposed in the module housing interior, with the second clutch being configured to selectively rotatably couple the second output shaft to the countershaft to deliver rotational power to the countershaft. The transmission system further includes an electric machine, with the electric machine including a rotor and a stator, and with the electric machine being configured to deliver rotational power to at least one of the first and second output shafts to deliver rotational power to the countershaft. The countershaft is rotatably coupled to either of the first and second output shafts for all of the gear ratios. A method of controlling the transmission system of the vehicle is also disclosed herein.

As such, the transmission system is cheaper to manufacture than traditional transmission systems, as there are fewer components to include in the transmission system. Second, the transmission system is lighter than traditional transmission systems, as fewer components are needed, which ultimately increases fuel economy of the vehicle. Third, the transmission system occupies less space in an engine bay, which results in a smaller turning radius of the vehicle, which is particularly important in urban parking situations. Fourth, the transmission system has a high natural frequency. Fifth, engineering design costs for the transmission system may be reduced.

BRIEF DESCRIPTION OF THE DRAWINGS

Other advantages of the present disclosure will be readily appreciated, as the same becomes better understood by reference to the following detailed description when considered in connection with the accompanying drawings.

FIG. 25 is a table illustrating various modes of operation of the vehicle.

FIG. 26 is a table illustrating various battery and generator sizes for the vehicle.

DETAILED DESCRIPTION

Figure 1:
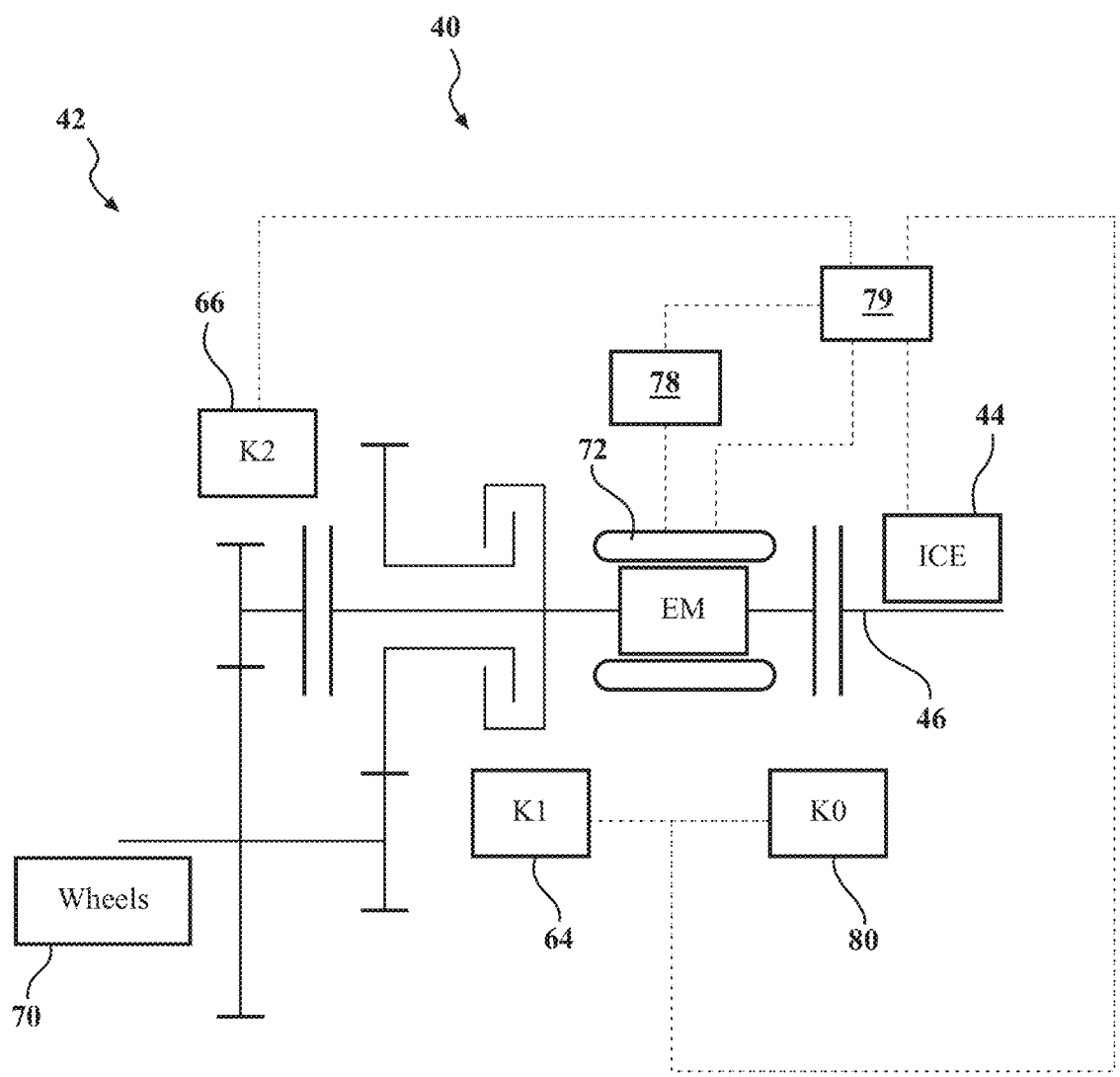
FIG. 1 is a schematic illustration of a transmission system of a vehicle, with the transmission system including one embodiment of an electric machine, and with the vehicle including an internal combustion engine and wheels.
Figure 20:
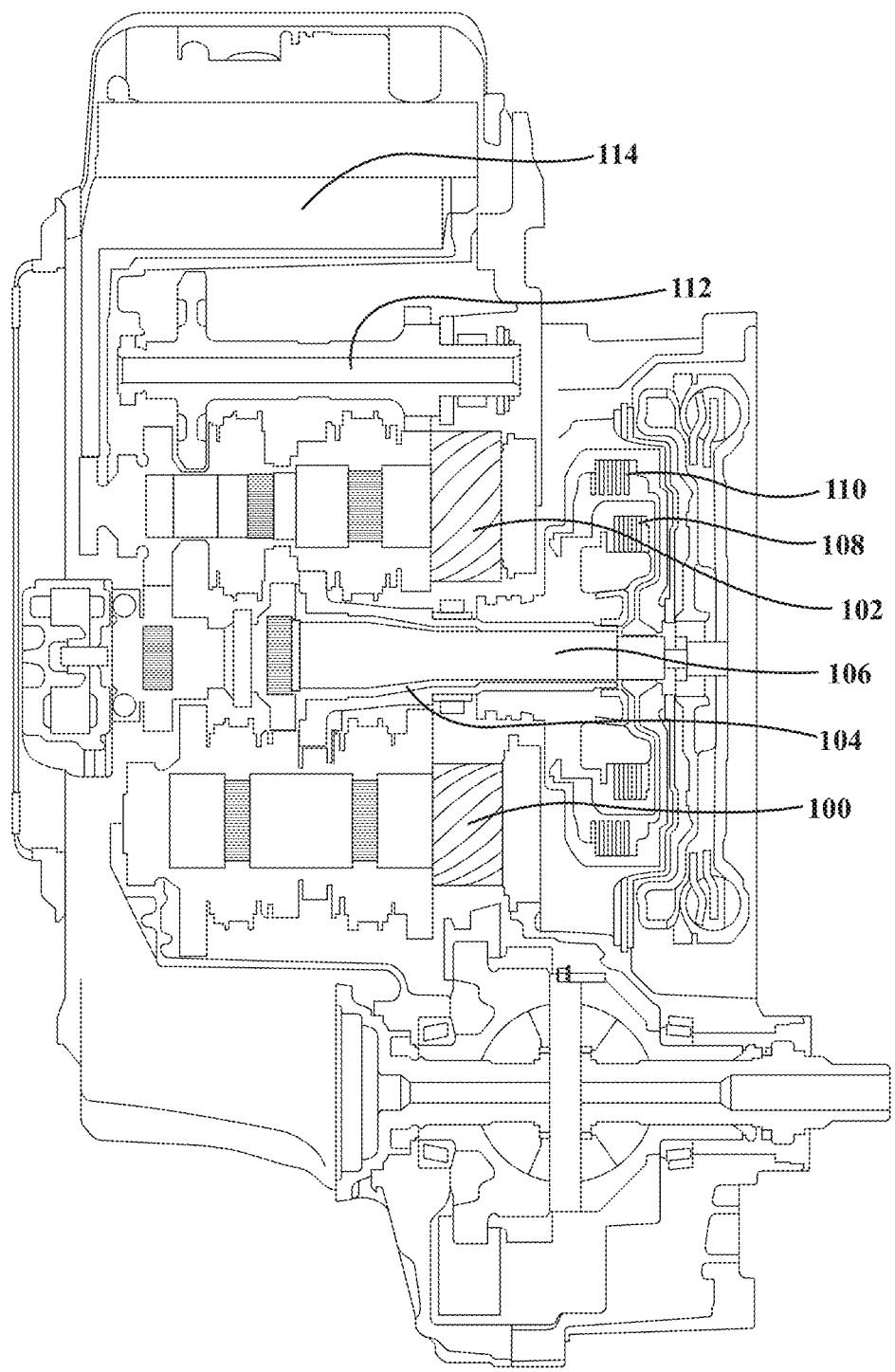
FIG. 20 is a side view of a conventional dual clutch transmission including a first and second countershaft, first and second clutches, a reverse shaft, and mechatronics.

With reference to the Figures, wherein like numerals indicate like parts throughout the several views, a transmission system 40 of a vehicle 42 is schematically shown in FIG. 1. Typically, the vehicle 42 includes an internal combustion engine 44 including a crankshaft 46, as shown in FIG. 1. In such embodiments, the vehicle 42 may be referred to as a hybrid electric vehicle (BEV), a plug-in hybrid vehicle (PHEV), and the like. Such BEV vehicles, PHEV vehicles, and the like may be referred to as a dedicated hybrid vehicle. In such embodiments, the vehicle 42 is propelled by the internal combustion engine 44 and/or electric power, as described in further detail below. In embodiments where the vehicle 42 does not include an internal combustion engine, the vehicle 42 may be referred to as a battery electric vehicle (BEV), as schematically illustrated in FIG. 20. In such embodiments, the vehicle 42 is propelled solely using electric power.

The transmission system 40 includes a transmission housing 48. The transmission housing 40 typically defines a transmission housing interior 50. The transmission system 40 also includes a countershaft 52 having no less than two gears 54. The gears 54 define a plurality of gear ratios. Accordingly, in one embodiment, the countershaft 52 has two gears 54 and, therefore, two gear ratios. In other words, the countershaft 52 in such embodiments has only two gears 54, meaning no less than two gears 54 and no more than two gears. In another embodiment, the countershaft 52 has three gears 54 and, therefore, three gear ratios. In other words, the countershaft 52 in such embodiments has only three gears 54, meaning no more than three gears 54. In yet another embodiment, the countershaft 52 has four gears 54 and, therefore, four gear ratios. In other words, the countershaft 52 in such embodiments has only four gears 54, meaning no more than four gears 54. It is to be appreciated that the countershaft 52 may have more than four gears 54 and, therefore, more than four gear ratios, such as five, six, seven, or eight or more gear ratios.

The transmission system 40 further includes a module housing 56 coupled to the transmission housing 48, with the module housing 56 defining a module housing interior 58. The transmission system 40 also includes a first output shaft 60 rotatably coupled to the countershaft 52, and a second output shaft 62 rotatably coupled to the countershaft 52. The first and second output shafts 60, 62 are configured to deliver rotational power to the countershaft 52 to ultimately propel the vehicle 42. The second output shaft 62 may have a solid configuration, and the first output shaft 60 may have a hollow configuration with the second output shaft 62 disposed in the first output shaft 60. In such embodiments, the first and second output shafts 60, 62 extend along a common output axis CA, as shown in at least FIGS. 7-9. However, it is to be appreciated that the first and second output shafts 60, 62 may extend along a separate axis. When the first and second output shafts 60, 62 extend along the separate axis, the first and second output shafts 60, 62 are typically parallel to one another.

The transmission system 40 additionally includes a first clutch 64 and a second clutch 66 disposed in the module housing interior 58. Typically, the first and second clutches 64, 66 are multi-disk clutches. An example of the transmission system 40 using the first and second clutches 64, 66 is a dual-clutch transmission. However, any suitable clutch may be used. The first clutch 64 is configured to selectively rotatably couple the first output shaft 60 to the countershaft 52 to deliver rotational power to the countershaft 52. The second clutch 66 is configured to selectively rotatably couple the crankshaft 46 to the countershaft 52 to deliver rotational power to the countershaft 52. In other words, when the first clutch 64 is closed, the first output shaft 60 delivers rotational power to the countershaft 52. When the second clutch 66 is closed, the second output shaft 62 delivers rotational power to the countershaft 52. When the first or second output shafts 60, 62 deliver rotational power to the countershaft 52, the countershaft 52 then delivers the rotational power to a transmission output shaft 68 of the transmission system 40 to ultimately rotate wheels 70 of the vehicle 42. It is to be appreciated that the first and second output shafts 60, 62 may be referred to an odd output shaft and an even output shaft, respectively, when the transmission system 40 has more than two gears 54. For example, the first output shaft 60 may be used to deliver rotational power to the countershaft 52 for odd gear ratios, such as first and third gear. The second output shaft 62 may be used to deliver rotational power to the countershaft 52 for an even gear ratio, such as second gear. However, it is to be appreciated that in embodiments where the countershaft 52 has only two gears 54 (i.e., no less than two gears 54 and no more than two gears 54), the first output shaft 60 is used to deliver rotational power to the countershaft 52 for the first gear, and the second output shaft 52 is used to deliver rotational power to the countershaft 52 for the second gear.

The transmission system 40 also includes an electric machine 72 including a rotor 74 and a stator 76. The electric machine 72 is configured to deliver rotational power to at least one of the first and second output shafts 60, 62 to deliver rotational power to the countershaft 52. In other words, the electric machine 72 is configured as an electric motor for delivering rotational power to at least one of the first and second output shafts 60, 62. In such embodiments, the vehicle 42 typically includes a battery 78 (often referred to as a traction battery) for storing and delivering electrical power to the electric machine 72. The vehicle 42 also typically includes a controller 79 for controlling electrical power to and from the electric machine 72. The electric machine 72 may also be configured as a generator for converting mechanical movement to generate electrical power to recharge the battery 78 of the vehicle 42. The countershaft 52 is rotatably coupled to either of the first and second output shafts 60, 62 for all of the gear ratios. Typically, as illustrated in FIG. 1, the electric machine 72 and the module housing 56 form a "P2 hybrid" module (disposed between the transmission housing 48 and the internal combustion engine 44, with the electric machine 72 selectively rotatably coupled and decoupled from the internal combustion engine 44).

The transmission system 40 including the countershaft 52 that is rotatably coupled to either of the first and second output shafts 60, 62 for all of the gear ratios offers several advantages. First, the transmission system 40 is cheaper to manufacture, as there are fewer components to include in the transmission system 40. Second, the transmission system 40 is lighter than traditional transmission systems, as fewer components are needed, which ultimately increases fuel economy of the vehicle 42. Third, the transmission system 40 occupies less space in an engine bay, which results in a smaller turning radius of the vehicle 42, which is particularly important in urban parking situations. Fourth, the transmission system 40 has a high natural frequency. Fifth, engineering design costs for the transmission system 40 may be reduced.

Typically, the transmission system 40 is free of a second countershaft. In other words, the countershaft 52 is the only countershaft included in the transmission system 40. With particular reference to FIGS. 1, 7-9, and 19, having the transmission system 40 free of a second countershaft allows the countershaft 52 and the first and second output shafts 60, 62 to reduce their combined length L along the common output axis CA. In particular, the combined length L along the common axis CA may be further reduced when the countershaft 52 has a lower number of gears 54, such as only two gears. When the length L of the countershaft 52 and/or the first and second output shafts 60, 62 are reduced, the overall length of the transmission housing 48 and module housing 56 is reduced when coupled together, as shown in FIGS. 8A, 8B, 9, and 19. In doing so, the turning radius of the vehicle 42 is able to be reduced due to the decreased space taken up in the engine bay by the transmission system 40. Additionally, decreasing the length L of the countershaft 52 and/or the first and second output shafts 60, 62 allows more room in the engine bay, which then allows the vehicle 42 to include additional crash rails, or stronger crash rails, in the engine bay for increasing a crash rating of the vehicle 42. Further, decreasing the length L of the countershaft 52 and/or the first and second output shafts 60, 62 improves a bending frequency of the transmission system 40 and, specifically, the transmission housing 48.

Figure 7:
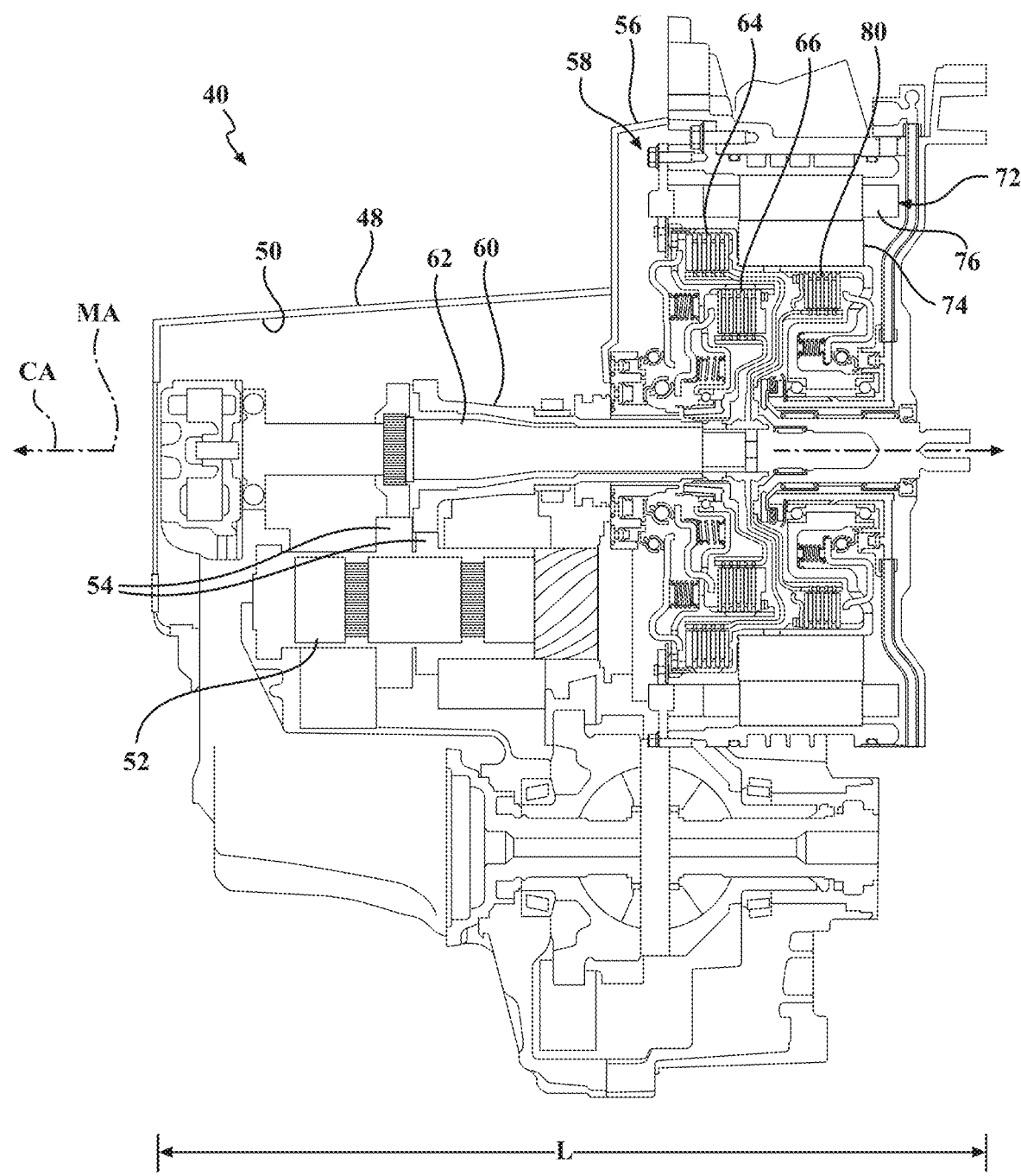
FIG. 7 is a cross-sectional view of one embodiment of the transmission system.
Figure 8A:
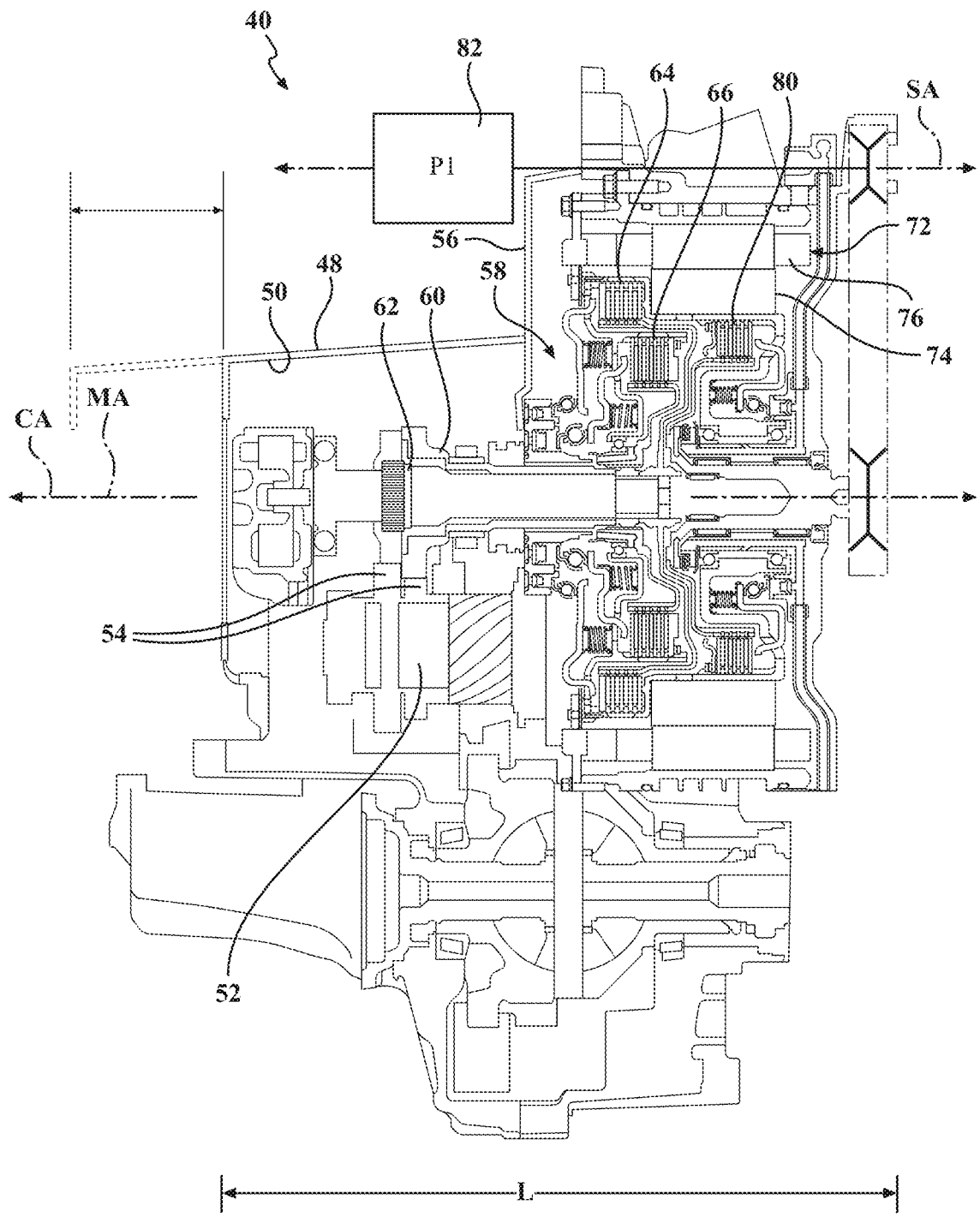
FIG. 8A is a cross-sectional view of one embodiment of the transmission system including the first and second electric machines.
Figure 8B:
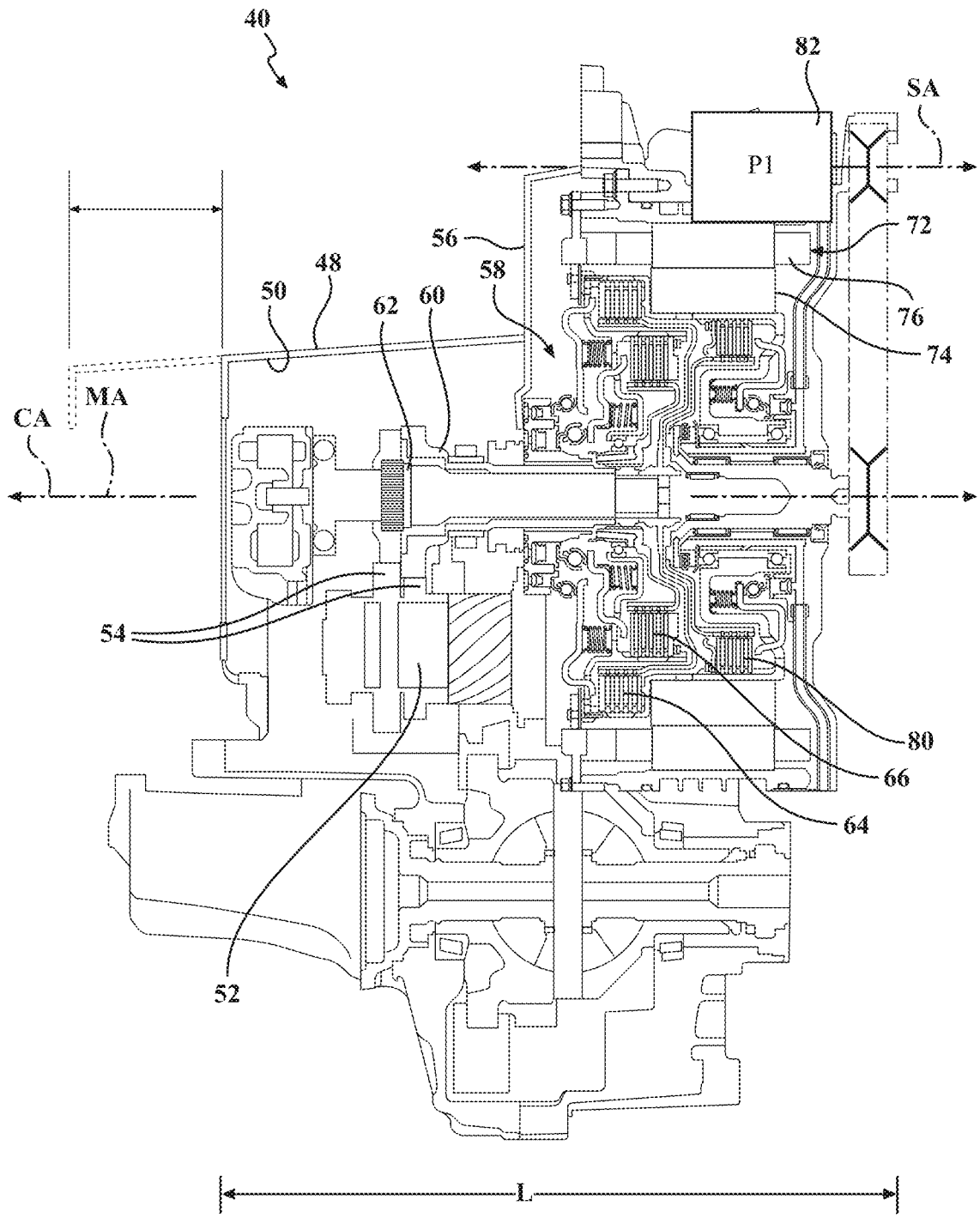
FIG. 8B is a cross-sectional view of one embodiment of the transmission system including the first and second electric machines.
Figure 19:
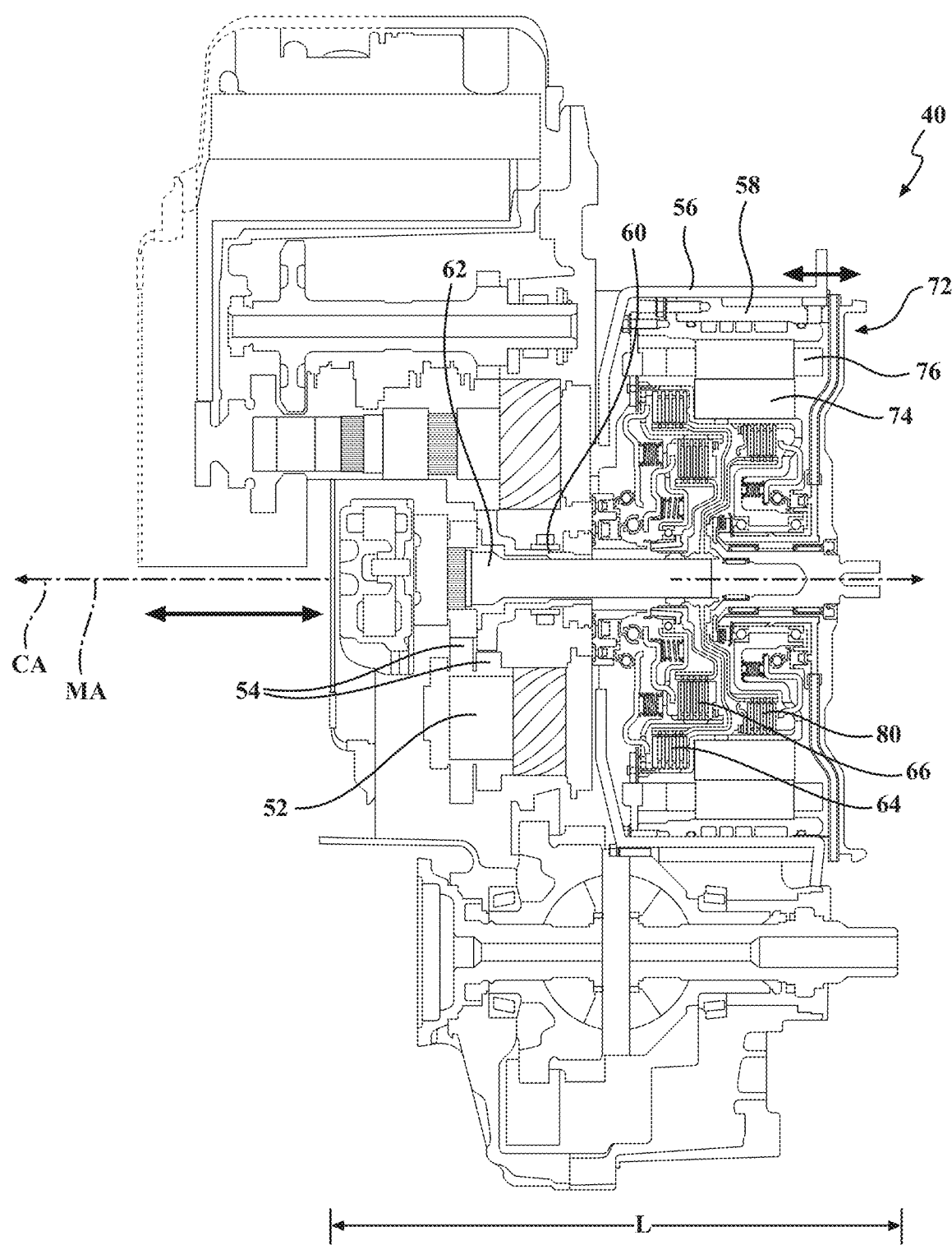
FIG. 19 is a cross-sectional view of one embodiment of the transmission system, with the transmission system free of a second countershaft, a synchronizer, a fork, a fork actuator, a fork sensing mechanism, and/or a rev-idler, with the second countershaft, the synchronizer, the fork, the fork actuator, the fork sensing mechanism, and the rev-idler shown as shaded components.

Additionally, as shown in FIG. 19, the transmission system 40 may be free of a synchronizer, a fork, a fork actuator, a fork sensing mechanism, and/or a rev-idler, which are shown as shaded components in the transmission system 40 of FIG. 19. In such embodiments, the length L of the first and second output shafts 60, 62 and/or the countershaft 52 may be reduced, as shown in FIGS. 8A, 8B, 9, and 19. Transmission systems that include a synchronizer are required to do a "power on" shift. However, the transmission system 40 free of a synchronizer allows the transmission system 40 to perform a "power-off" shift. Having the transmission system 40 free of a synchronizer, a fork, a fork actuator, a fork sensing mechanism, and/or a rev-idler may allow the transmission system 40 to be installed into an existing drivetrain of a vehicle, which decreases costs as components of the drivetrain may be reused and the transmission system 40 may be retrofitted to the existing drivetrain. For example, as shown in FIG. 7, the transmission system 40 is using similar architecture in terms of length of the transmission housing 48, and the first and second output shafts 60, 62 as shown in the conventional transmission system shown in FIG. 20. It is to be appreciated that the countershaft 52 may be a carry-over from a conventional transmission, with the first and second output shafts 60, 62 being configured to be coupled to the countershaft 52 such that the first and second output shafts 60, 62 deliver rotational power either of the first and second output shafts 60, 62 for all of the gear ratios. In some embodiments, the box encircling the first and second gears GR1 and GR2 may be a carry-over from a conventional transmission, whereas the box encircling at least the electric machine 72 and other corresponding components may be configured to be coupled to the carry-over components.

The transmission system 40 is configured to deliver rotational power to the wheels 70 of the vehicle 42 through a variety of different modes. In particular, the transmission system 40 is configured to deliver rotational power to the wheels 70 of the vehicle 42 through a series mode and a parallel mode. The series mode of the vehicle 42 refers to when the internal combustion engine 44 alone provides rotational power to the countershaft 52 to ultimately drive the wheels 70, or to when the first and/or second electric machines 72, 82 alone is/are providing rotational power to the countershaft 52 to ultimately drive the wheels 70. On the other hand, the parallel mode of the vehicle 70 refers to when both the internal combustion engine 44, and the first and/or second electric machine 72, 82 simultaneously provide rotational power to the countershaft 52 to ultimately drive the wheels 70. It is to be appreciated that in embodiments where the second electric machine 82 is not present, the electric machine 72 and the internal combustion engine 44 alone may provide rotational power to the countershaft 52 when in the parallel mode, and that the electric machine 72 may solely provide rotational power to the countershaft 52 or the internal combustion engine 44 may solely provide rotational power to the countershaft 52 when in the series mode.

Typically, when the vehicle 42 is a BEV, the vehicle 42 in such embodiments only has a series mode. In particular, the series mode when the vehicle 42 is a BEV vehicle refers to when the electric machine 72 alone provides rotational power to the countershaft 52 to ultimately drive the wheels 70.

With reference to embodiments where the vehicle includes the internal combustion engine 44, an example of various series and parallel drive modes of the vehicle 42 are shown in FIG. 25. For example, when the countershaft 52 includes only two gears, the vehicle 42 may have the following modes. As shown in the Trio-Drive column, at launch, the vehicle 42 may be in the series mode. At urban low speed (20-50 kph), the vehicle 42 may be in the series or parallel mode. In particular, when in the series mode, the first electric machine 72 may deliver rotational power to the countershaft 52, the second electric machine 82 may deliver rotational power to the countershaft 52, or the internal combustion engine 44 may deliver rotational power to the countershaft 52. When in the parallel mode, the first and second electric machines 72, 82 may deliver rotational power to the countershaft 52, the first or second electric machines 72, 82 and the internal combustion engine 44 may deliver rotational power to the countershaft 52, or the first and second electric machines 82 and the internal combustion engine 44 may deliver rotational power to the countershaft 52. As shown in FIG. 25, the first or second gear of the countershaft 52 may be used for the series and parallel modes. Similarly, at highway speeds, the series or parallel mode may be used with the second gear of the countershaft 52. In embodiments where the vehicle 42 is a BEV, two gear ratios from the first and second gears 54 of the countershaft 52 are available. FIG. 26 relates to the different drive modes shown in FIG. 25. In particular, generator size and battery power available for the different drive modes are illustrated as an example in FIG. 26. The transmission system 42, as shown in FIG. 25 and as described herein, enables two parallel modes of operation, and two series modes of operation. It is to be appreciated that any suitable gear arrangement may be used for the transmission system 40 may be used for the BEV. For example, when the vehicle 42 is a BEV, the gear arrangement may be an IX (internal-external) gear arrangement.

Figure 24:
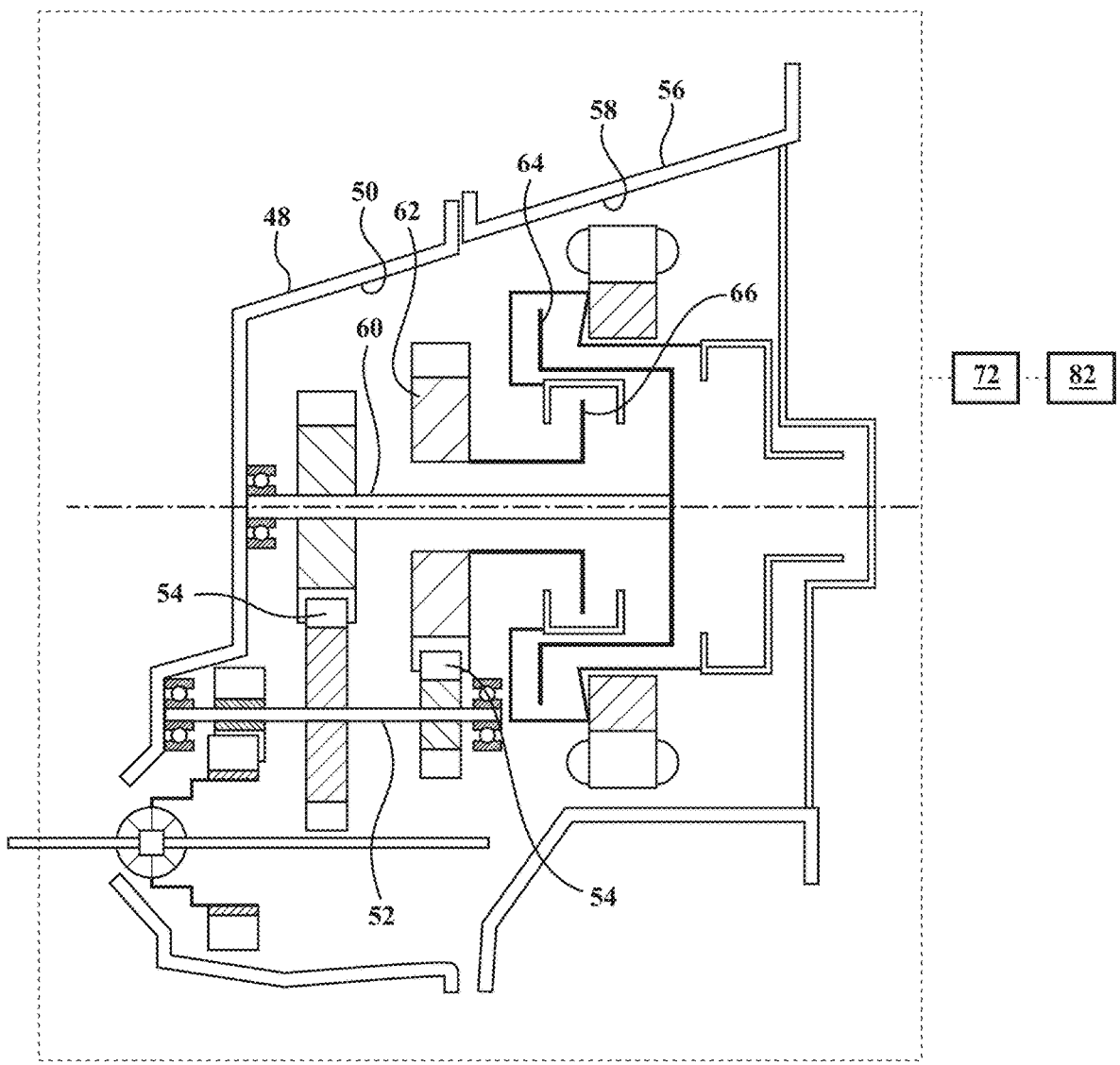
FIG. 24 is a schematic illustration of a transmission system for use in a battery electric vehicle (BEV).

When the vehicle 42 is a BEV, as shown in FIG. 24, the first clutch 64 may be further defined as a low clutch, and the second clutch may be redefined as a high clutch. In other words, the first clutch 64 is configured to deliver high rotational power, but lower RPM to the wheels 70 of the vehicle, and the second clutch 66 is configured to deliver lower rotational power than the first clutch, but higher RPM to the wheels 70 of the vehicle 42. It is to be appreciated that the first clutch 64 may be a one-way clutch. In such embodiments, the second clutch 66 is typically a multi-disk clutch. When the vehicle 42 is a BEV, the transmission system 40 may use some components of an existing drivetrain of a vehicle, such as the transmission housing and gearing. However, it is to be appreciated that when the vehicle 42 is a BEV, the transmission system 40 may be free of a transmission housing such that the first and second clutches 64, 66, the first and second output shafts 60, 62, and the countershaft 52 collectively form a standalone unit for propelling the vehicle 42. With continued reference to FIG. 24, when the vehicle 42 is a BEV, the first and second clutches 64, 66 are configured to rotatably couple the first and second output shafts 60, 62, respectively, to the countershaft 52 to deliver rotational power to the countershaft 52. In doing so, the transmission system 40 in such embodiments is able to deliver no less than two gear ratios based on the countershaft 52 having no less than two gears 54. Typically, when the vehicle 42 is a BEV, the countershaft 52 only has two gear ratios. However, it is to be appreciated that when the vehicle is a BEV, the countershaft 52 may have more than two gear ratios, such as three, four, or five or more gear ratios. When the vehicle 42 is a BEV, the transmission system 40 is typically configured to a power on shift. However, it is to be appreciated that when the vehicle 42 is a BEV, that the transmission system 40 is configured to do a power off shift.

The transmission system 40 may include a disconnect clutch 80 disposed in the module housing interior 58. When present, the disconnect clutch 80 is configured to selectively rotatably couple the crankshaft 46 of the internal combustion engine 44 to at least one of the first and second output shafts 60, 62. Said differently, the disconnect clutch 80 is configured to selectively rotatably connect a power source, for example the crankshaft 46 of the internal combustion engine 44, to the first and second output shafts 60, 62. In other embodiments, as described in further detail below, the power source may be a second electric machine for delivering rotational power to at least one of the first and second output shafts 60, 62.

Figure 10:
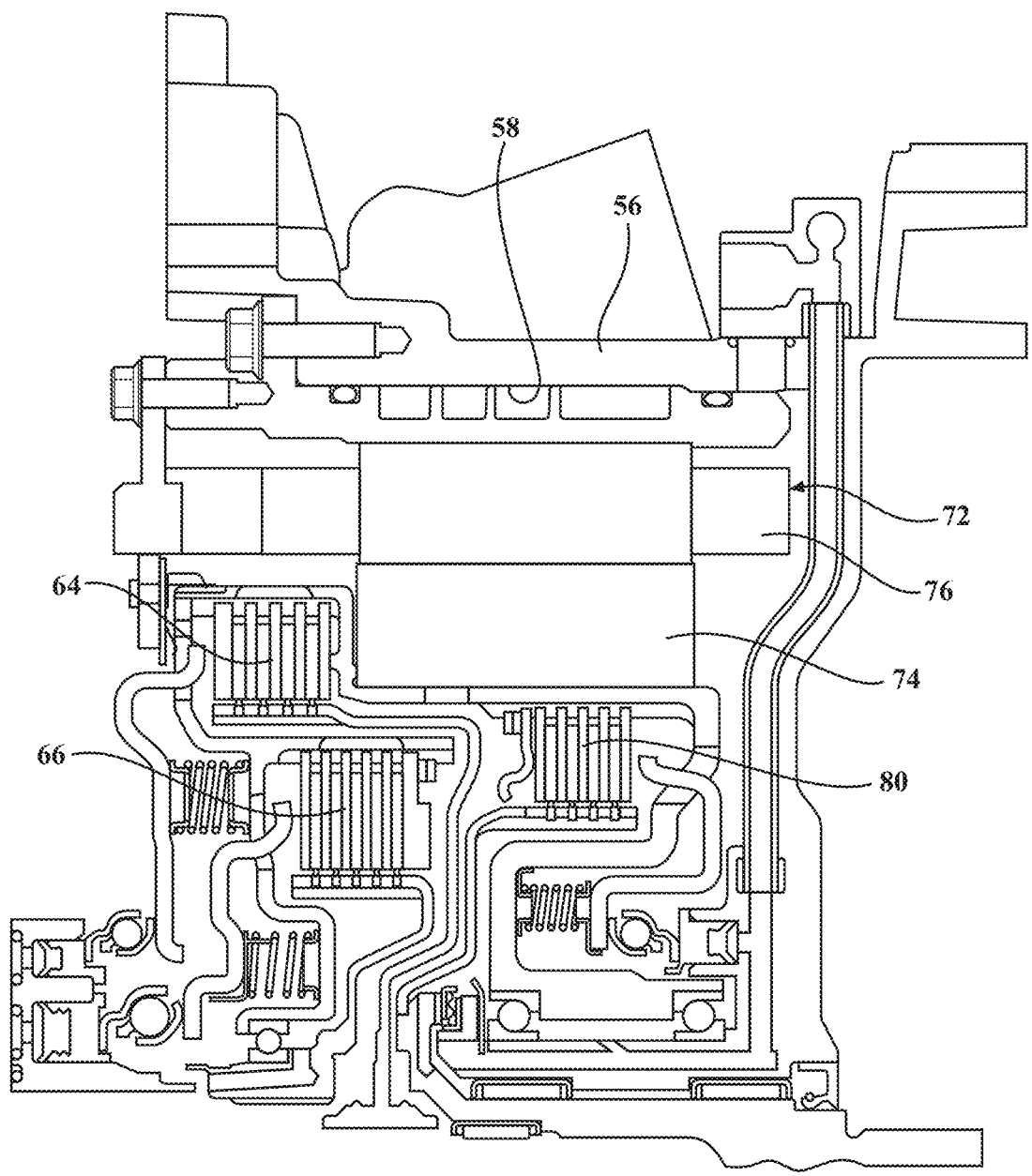
FIG. 10 is a cross-sectional view of a module housing, the electric machine, a disconnect clutch, a first clutch, and a second clutch of the transmission system.

With reference to FIG. 10, a close-up schematic view of the module housing 56, the disconnect clutch 80, the first clutch 64, and the second clutch 66 is shown. The disconnect clutch 80, first clutch 64, and second clutch 66 are shown as nested within the module housing interior 58. The exemplary arrangement of the disconnect clutch 80, the first clutch 64, and the second clutch 66 allows for a compact design of the transmission system 40. It is to be appreciated that the module housing 56, the first and second output shafts 60, 62, the first and second clutches 64, 66, and the electric machine 72 may collectively define a module assembly. In embodiments where the disconnect clutch 80 is present, the module assembly may also include the disconnect clutch 80.

Figure 9:
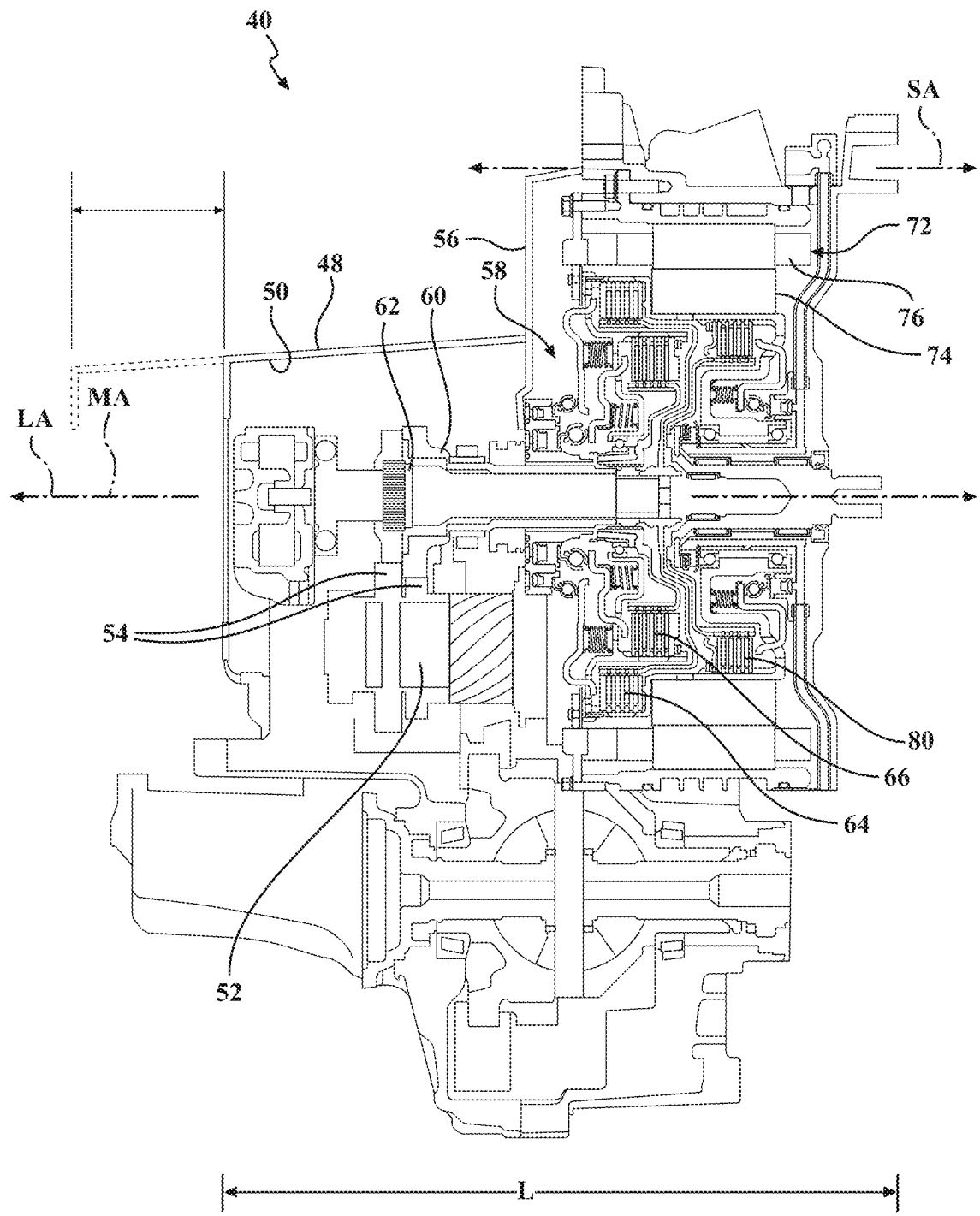
FIG. 9 is a cross-sectional view of one embodiment of the transmission system including the first and second electric machines.

In one embodiment, as shown in FIGS. 7-9, the electric machine 72 is disposed in the module housing interior 58. In some embodiments, the electric machine 72 extends along a machine axis MA. The machine axis MA and the common output axis CA may be parallel to one another such that the electric machine 72 and the first and second output shafts 60, 62 are axially aligned with one another. In other embodiments, the electric machine 72 may be disposed outside of the module housing interior 58. When the electric machine 72 is disposed outside of the module housing interior 58, the machine axis MA may be axially aligned with the common output axis CA, or may be axially offset from the common output axis CA.

Figure 2:
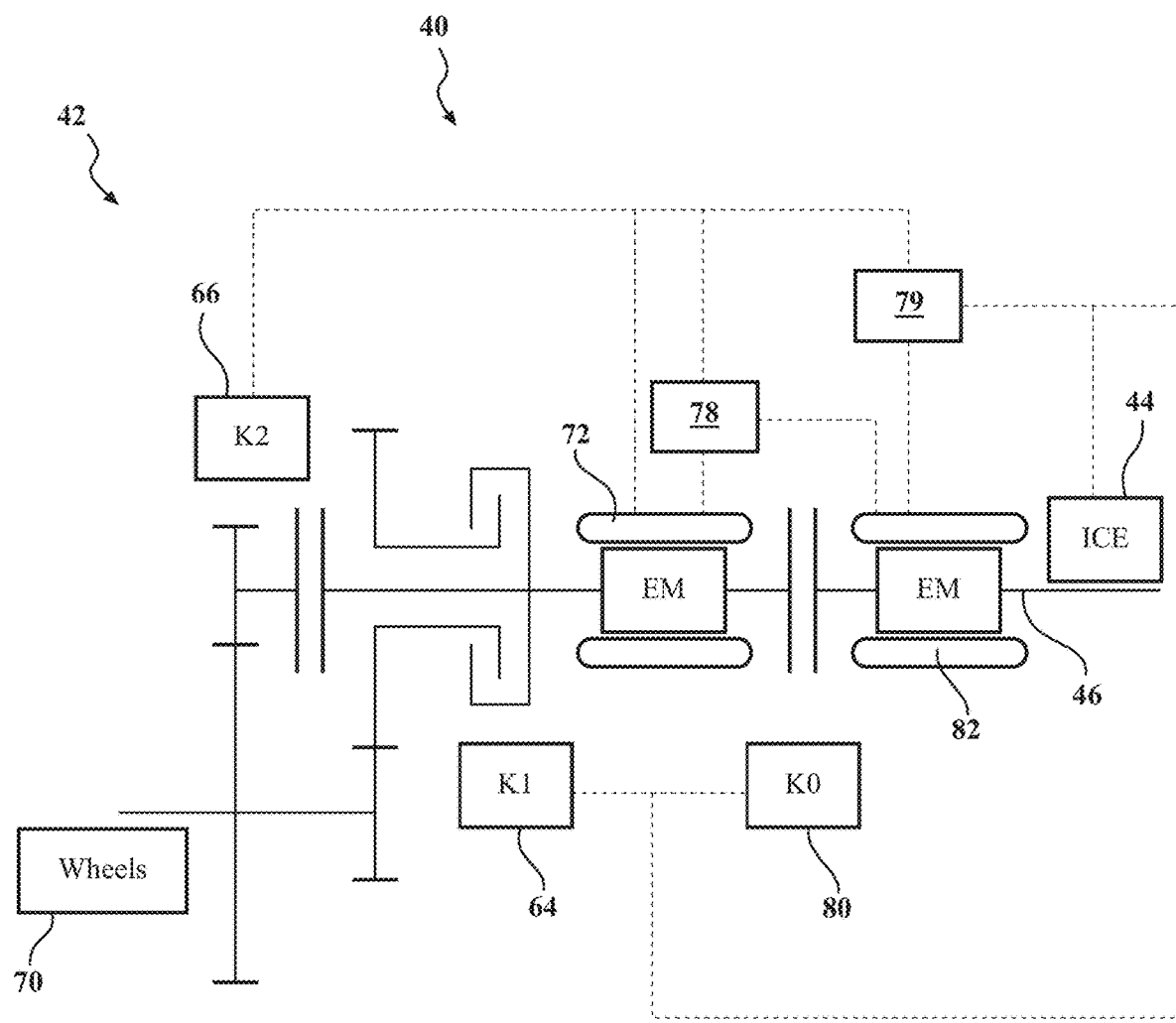
FIG. 2 is a schematic illustration of one embodiment of the transmission system, with the electric machine being further defined as a first electric machine, and with the transmission system further including a second electric machine.
Figure 3:
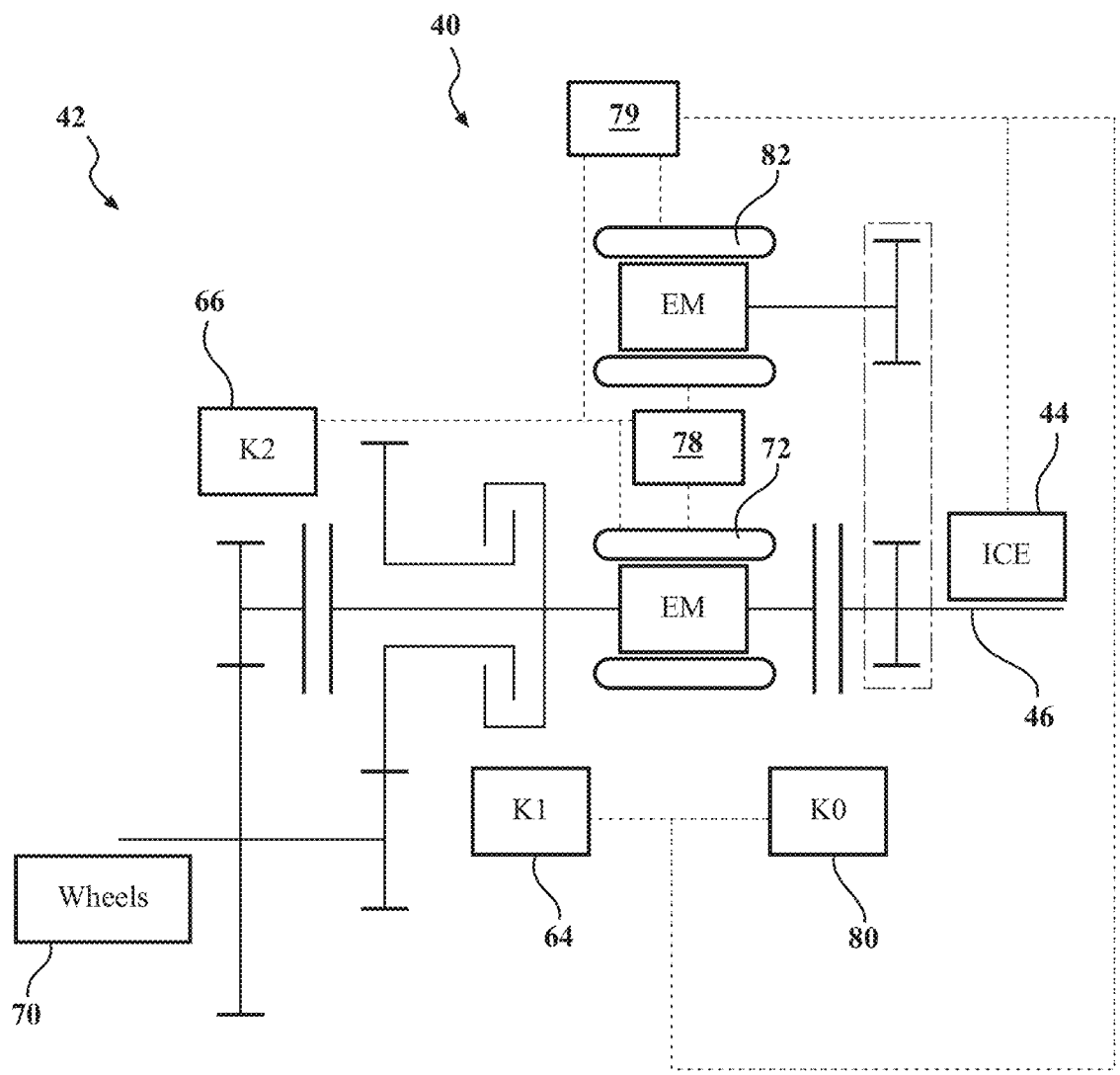
FIG. 3 is a schematic illustration of one embodiment of the transmission system including the first and second electric machines.
Figure 4:
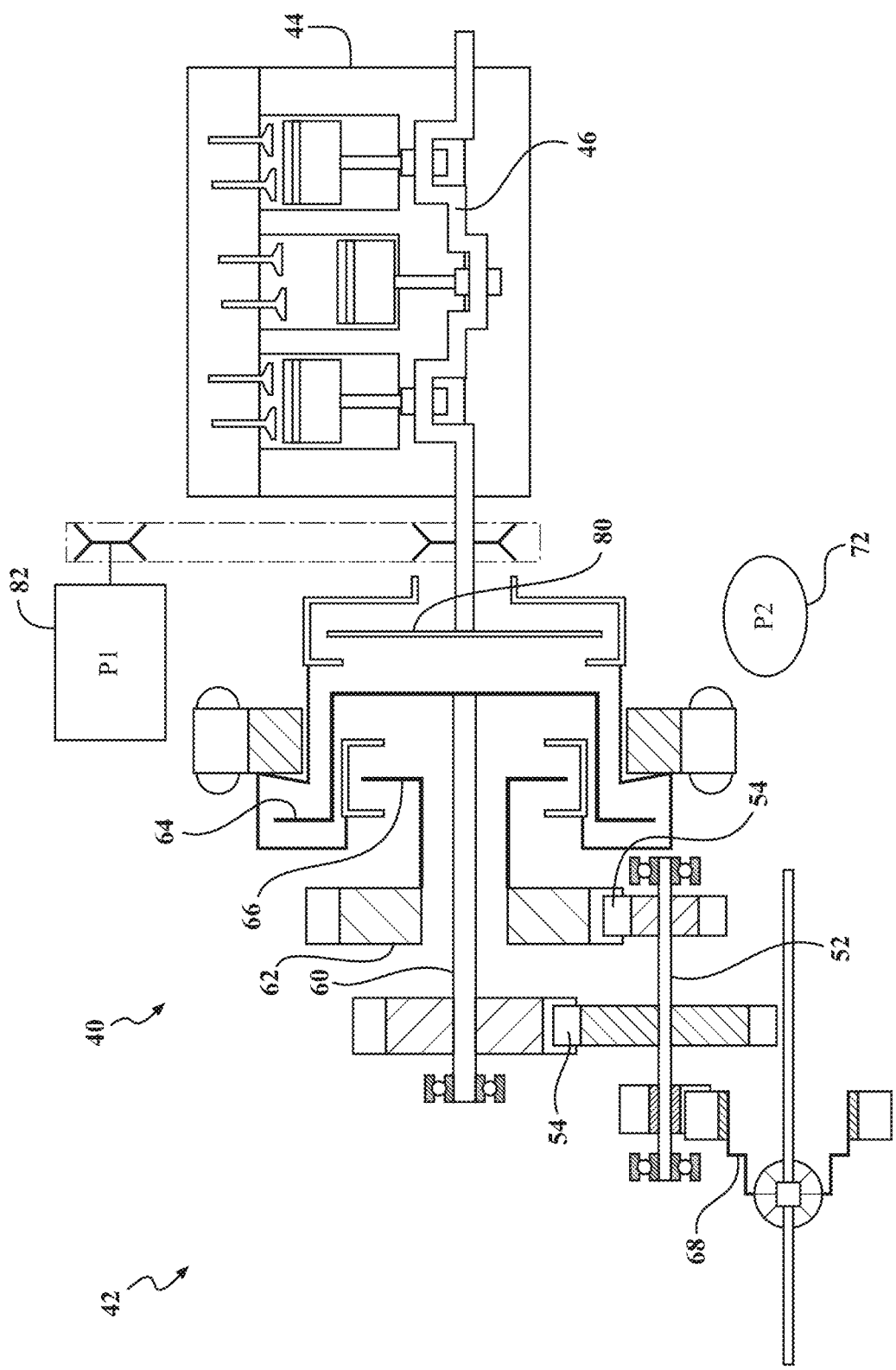
FIG. 4 is another schematic illustration of the transmission system of FIG. 3.
Figure 5:
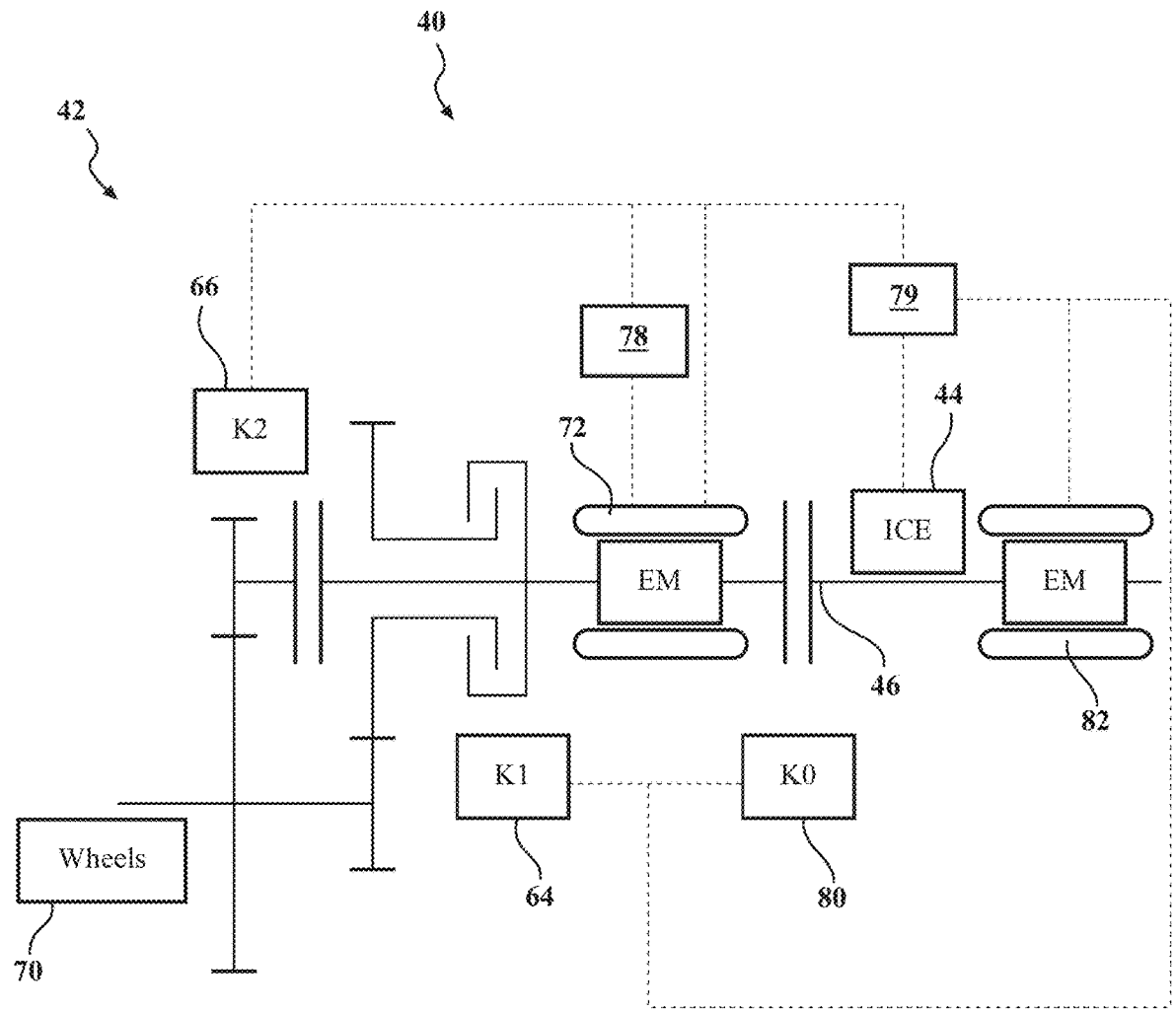
FIG. 5 is a schematic illustration of one embodiment of the transmission system including the first and second electric machines.
Figure 6:
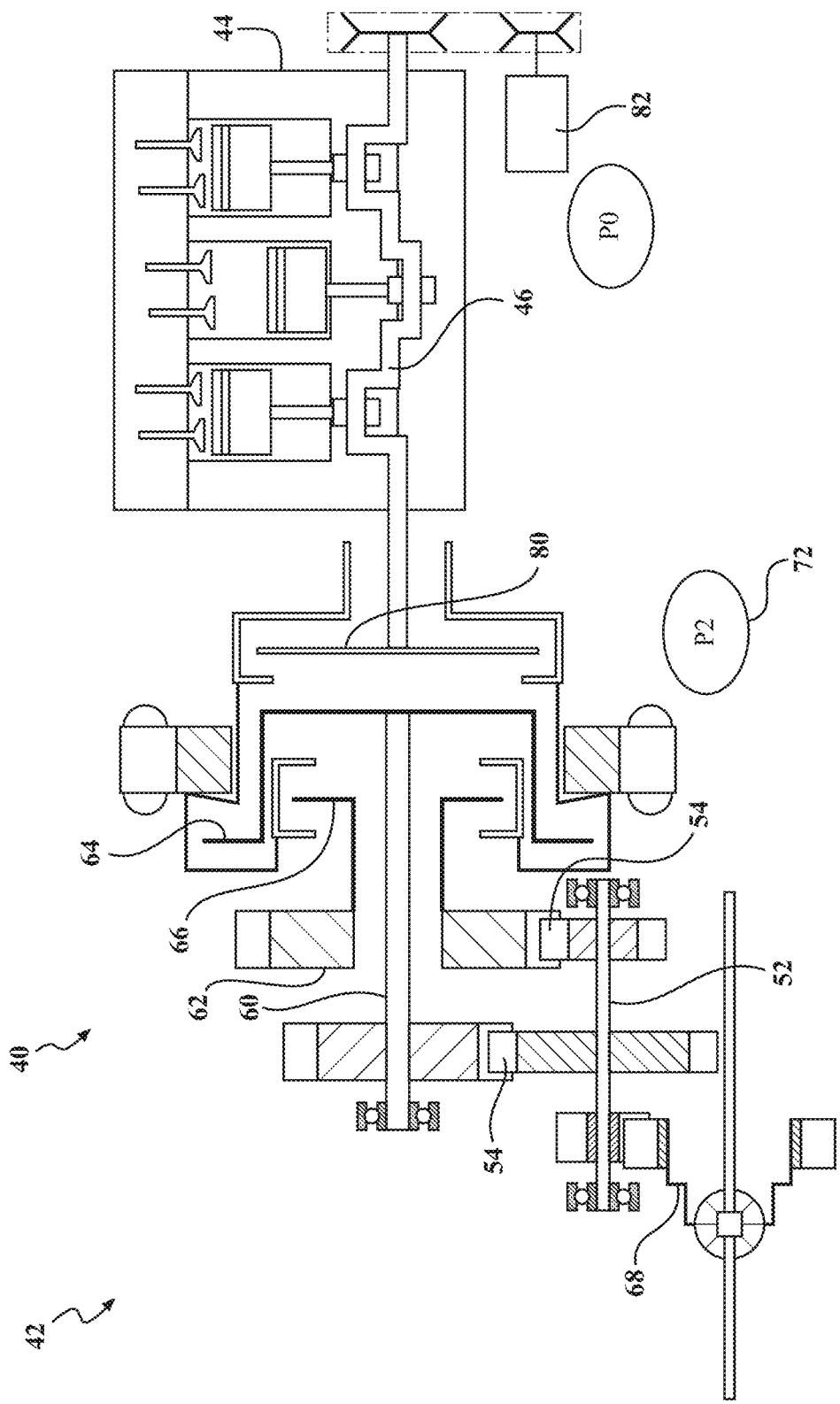
FIG. 6 is a schematic illustration of one embodiment of the transmission system including the first and second electric machines.

In some embodiments, the electric machine 72 may be further defined as a first electric machine 72, and the transmission system 40 may include a second electric machine 82. The second electric machine 82 includes a rotor and a stator. In such embodiments, the second electric machine 82 may extend along the machine axis MA. When the second electric machine 82 extends along the machine axis MA, the first and second electric machines 72, 82 are axially aligned with one another. For example, as shown in FIGS. 2 and 5, the second electric machine 82 is illustrated as extending along the machine axis MA. In such embodiments, the second electric machine 82 may be a "P1 hybrid" module (second electric machine 82 is rotatably coupled to the crankshaft 46 of the internal combustion engine 44), as shown in FIG. 2, or the second electric machine 82 may be a "P0 hybrid" module (second electric machine 82 is rotatably coupled to the crankshaft 46 through a front end accessory drive of the internal combustion engine 44), as shown in FIG. 5. The second electric machine 82 may be a belt alternator starter (BAS). The second electric machine 82 may also be off-axis from the machine axis MA, as shown in FIGS. 3, 4, and 6. In FIGS. 3 and 4, the second electric machine 82 is illustrated as a "P1 hybrid" module. In FIG. 6, the second electric machine 82 is illustrated as a "P0 hybrid" module. Having the second electric machine 82 off-axis from the machine axis MA further allows for the length module housing 56 and, in turn, the overall transmission system 40 to be shortened when compared to having the second electric machine 82 axially aligned with the machine axis MA.

In other embodiments, the second electric machine 82 may extend along a second machine axis SA that is axially offset from the machine axis MA. In such embodiments, the first electric machine 72 may be disposed in the module housing interior 58, and the second electric machine 82 may be disposed outside of the module housing interior 58. For example, as shown in FIGS. 2-4, 8A, and 8B, the first electric machine 72 and the second electric machine 82 selectively deliver rotational power to the first output shaft 60 and/or the second output shaft 62 by way of the disconnect clutch 80. In such examples, the first electric machine 72 may be referred to as a "P2 hybrid" module (disposed between the transmission housing 48 and the internal combustion engine 44, with the first electric machine 72 selectively rotatably coupled and decoupled from the internal combustion engine 44), whereas the second electric machine 82 may be referred to as a "P1 hybrid" module (coupled directly to the crankshaft 46 of the internal combustion engine 44). In other words, the second electric machine 82 is selectively rotatably coupled to the first output shaft 60 and/or the second output shaft 62, and is rotatably coupled to the crankshaft 46 of the internal combustion engine 44. The second electric machine 82 may be chain or gear driven "P1 or P2 hybrid" module, as shown in FIGS. 4, 6, 8A, and 8B. As described above, the transmission system 40 may be free of a second countershaft. In embodiments where the transmission system 40 is free of a second countershaft, the second electric machine 82 may be located adjacent to the first and second output shafts 60, 62 and may occupy the space where a second countershaft would typically occupy, as illustrated in FIG. 8A. In doing so, a more compact design of the transmission system 40 including the first and second electric machines 72, 82 is achieved, which results in a lighter transmission system 40, and improved turning radius of the vehicle 42, and also provides an opportunity to include an internal combustion engine with larger displacement due to the additional space in the engine bay.

During certain modes of operation of the vehicle 42, the second electric machine 82 and the internal combustion engine 44 may both deliver rotational power to the first output shaft 60 and/or the second output shaft 62 when the disconnect clutch 80 is closed. Even further, the first electric machine 72 may also deliver rotational power to the first output shaft 60 and/or the second output shaft 62 simultaneously in conjunction with the second electric machine 82 and/or the internal combustion engine 44.

The transmission system 40 may be configured to do both a power on shift and a power off shift. Additionally, the transmission system 40 may a fail soft mode in which the internal combustion engine 44 is able to propel the vehicle 42 if the first and/or second electric machines 72, 82, or an inverter fails. For example, when the first and/or second electric machines 72, 82 or the inverter fails, the vehicle 42 may be launched by closing the disconnect clutch 80 and by modulating either the first clutch 64 or the second clutch 66. As another example, when the first and/or second electric machines 72, 82 or the inverter fails, the vehicle 62 may be launched by closing either the first clutch 64 or the second clutch 66, and by modulating the disconnect clutch 80.

Figures 11, 12:
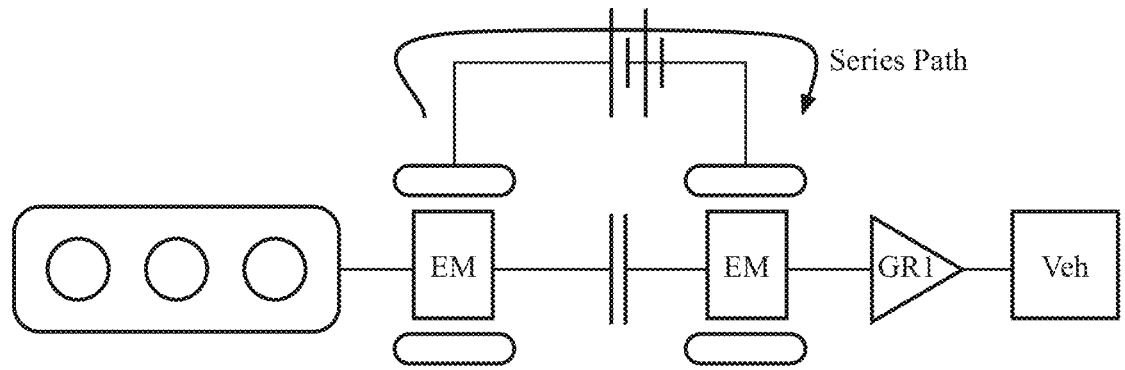
FIG. 11 is a schematic illustration of an internal combustion engine and a conventional transmission system including only a single gear and a first and second electric machine.
FIG. 12 is a table illustrating various modes of operation of the vehicle and the transmission system of FIG. 11.

FIG. 11 is a schematic illustration of a conventional transmission system including a first and second electric machine, and only including no more than a single gear ratio (GR1), which is represented in the fifth row of the table in FIG. 12. In FIG. 12, a table illustrates various driving modes of a conventional vehicle including a transmission system having only one gear ratio. The rows relate to the mode of the vehicle (series or parallel), the size of the generator/motor (~30 kW or ~100 kW), and whether the disconnect clutch (K0) is open or closed. The final row represents the efficiency of transmission system of the conventional vehicle. The efficiency refers to the overall system efficiency, which is the conversion of battery energy to tractive energy at the wheels of the conventional vehicle. As for the columns, the second column, third column, third column, and fourth column represents speed of the vehicle in kph.

Figures 13, 14:
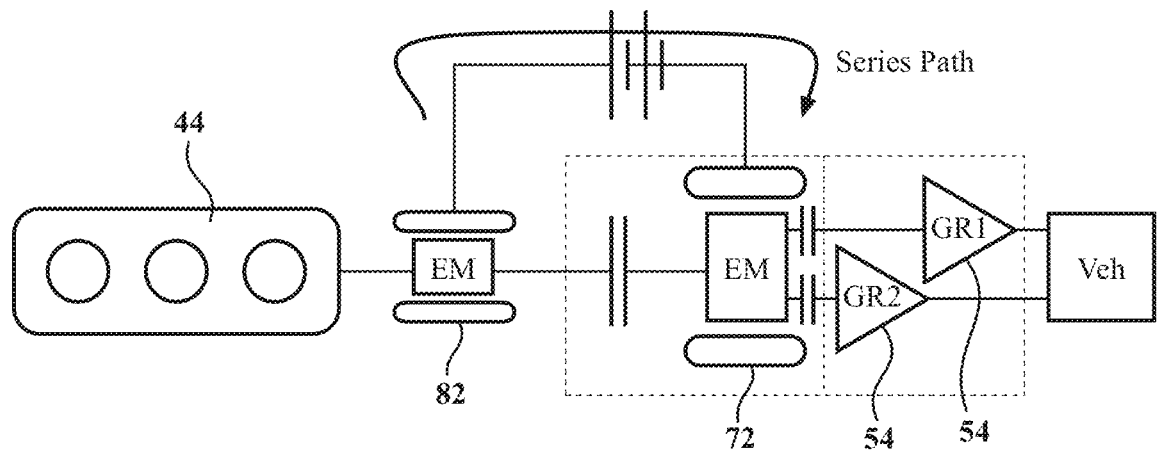
FIG. 13 is a schematic illustration of the internal combustion engine and one embodiment of the transmission system including two gear ratios and the first and second electric machines.
FIG. 14 is a table illustrating various modes of operation of the vehicle and the transmission system of FIG. 13.

FIG. 13 is a schematic illustration of one embodiment of the transmission system 40. In particular, the transmission system 40 is illustrated as having two gears 54 (GR1 and GR2) and, therefore, two gear ratios. In FIG. 14, a table illustrates various driving modes of the vehicle 42. The rows represent the driving mode of the vehicle (series or parallel), the size of the generator/motor (~30 kW or ~100 kW), whether the disconnect clutch (K0) is open or closed, and whether the first gear ratio GR1 or the second gear ratio GR2 is used. Finally, the final row represents the efficiency of the transmission system 40 of the vehicle 42. The efficiency refers to the overall system efficiency of the transmission system 40, which is the conversion of battery energy to tractive energy at the wheels 70 of the vehicle 42. As for the columns, the second column, third column, third column, and fourth column represents speed of the vehicle 42. As shown in FIG. 14, the efficiency of the transmission system 40 is greater than that of the conventional transmission system of FIG. 11 including no more than a single gear ratio GR1. In particular, the transmission system of FIG. 11 is only able to provide series power with a single gear ratio, which limits the operating range of the transmission system and the efficiency of the vehicle, whereas the transmission system 40 is able to provide both a series and parallel operating mode, and is able to provide two gear ratios.

Figure 15:
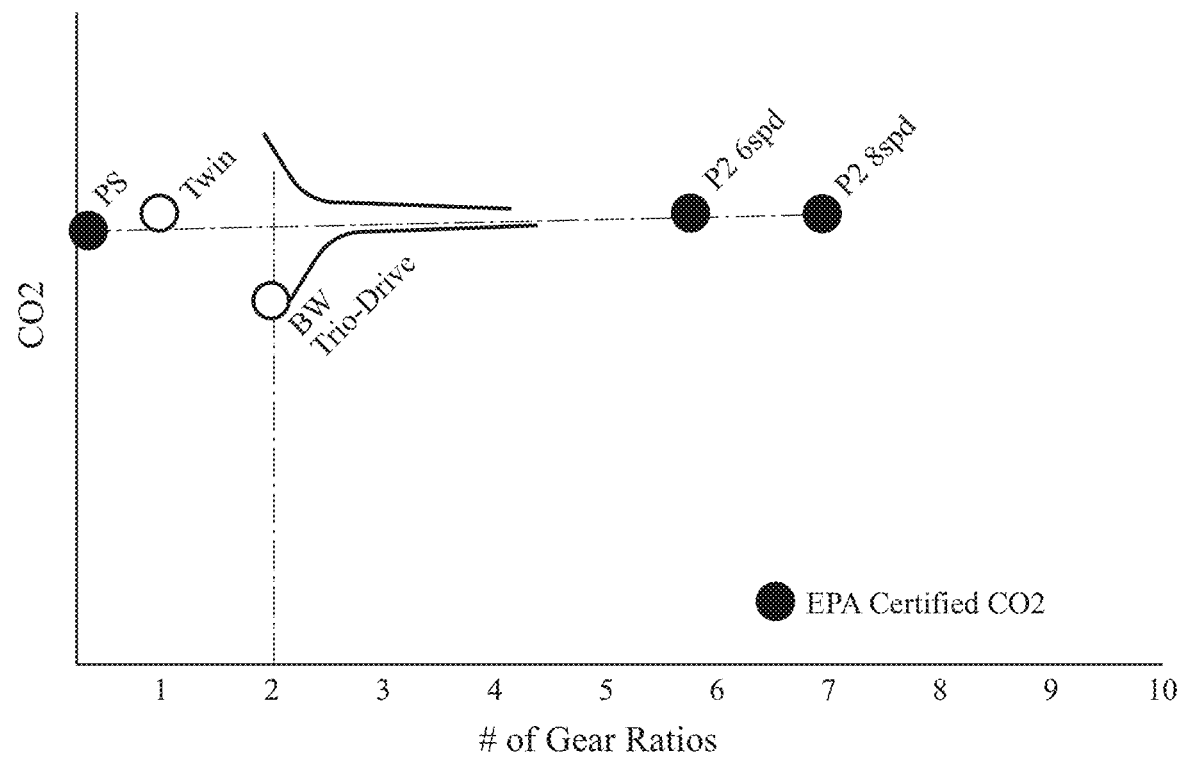
FIG. 15 is a chart illustrating CO2 emissions of the transmission system as a function of the number of gear ratios.
Figure 16:
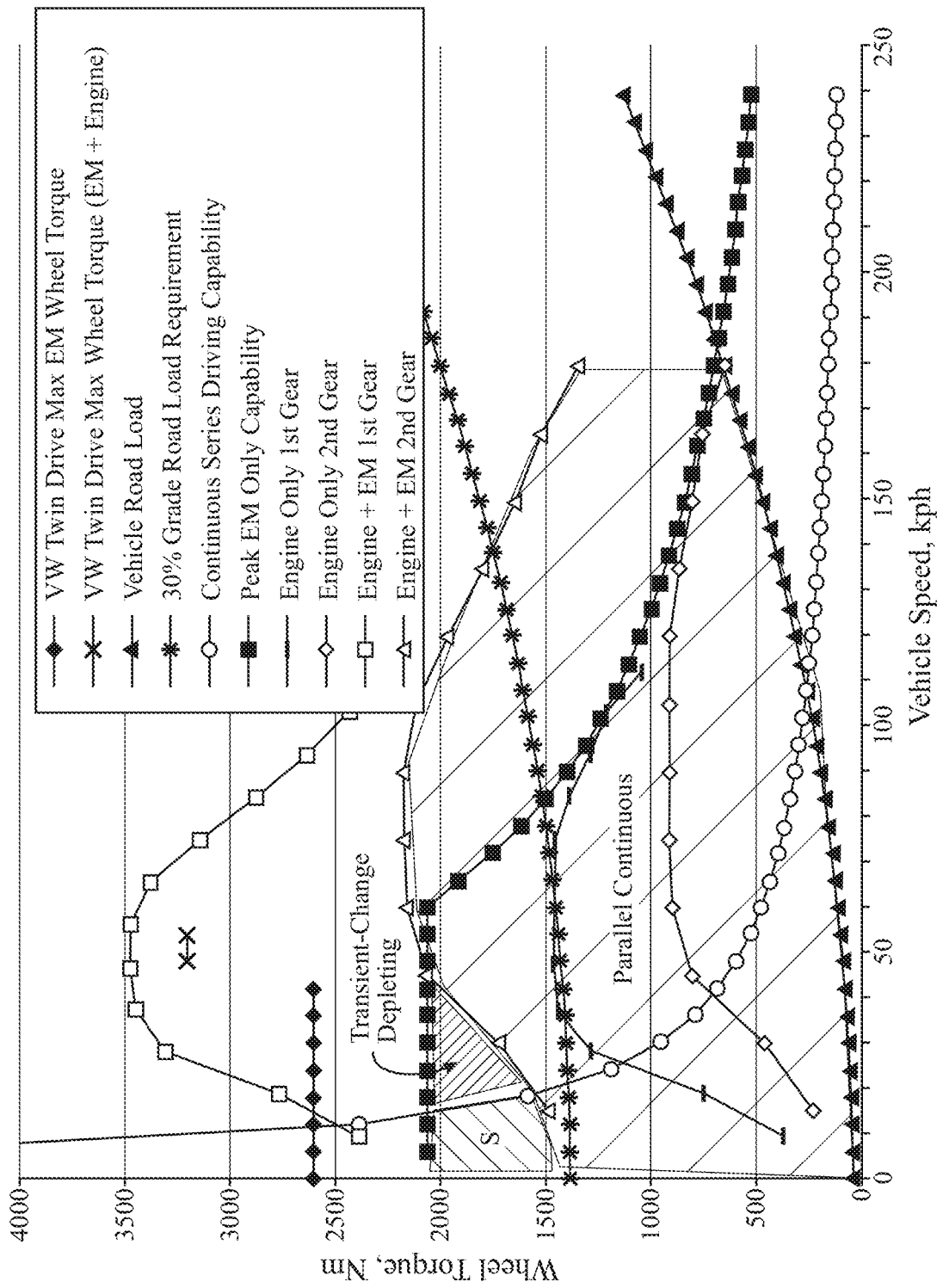
FIG. 16 is a chart illustrating various modes of operation of the vehicle based on various driving conditions.

FIG. 15 is a graph representing $CO_2$ emissions as a dependent variable on the y-axis, and the number of gear ratios of the transmission system 40 as an independent variable on the x-axis. As shown in FIG. 16, the transmission system 40 including the countershaft 52 that has no less than two gears, and that is rotatably coupled to either of the first and second output shafts 60, 62 for all of the gear ratios results in lower $CO_2$ emissions when compared to other transmission systems. In particular, when the countershaft 52 includes only two gears (i.e., no more than two gears and no less than two gears), typically results in the lowest $CO_2$ emissions.

FIG. 16 is a graph showing wheel torque as a function of vehicle speed. Additionally, various driving modes of the vehicle 42 are shown as a function of vehicle speed. For example, various driving modes of the vehicle 42 shown in FIG. 16 include internal combustion engine 44 only mode for first and second gear (series modes), and combined internal combustion engine 44 and electric machine 72 mode (parallel mode). The mode of operation of the vehicle 42 is typically selected based on the most efficient mode of operation that meets the driving demands of the vehicle 42. The "twin drive max" refers to vehicle modes of a conventional transmission system. In embodiments including the second electric machine 82, additional rotational power may be added from the second electric machine 82 when the vehicle 42 is at low speed. The "S" in FIG. 16 is representative of an example region for when the series mode of operation is most efficient, and the "Parallel Continuous" region is representative of an example region for when the parallel mode of operation is most efficient.

Figure 17:
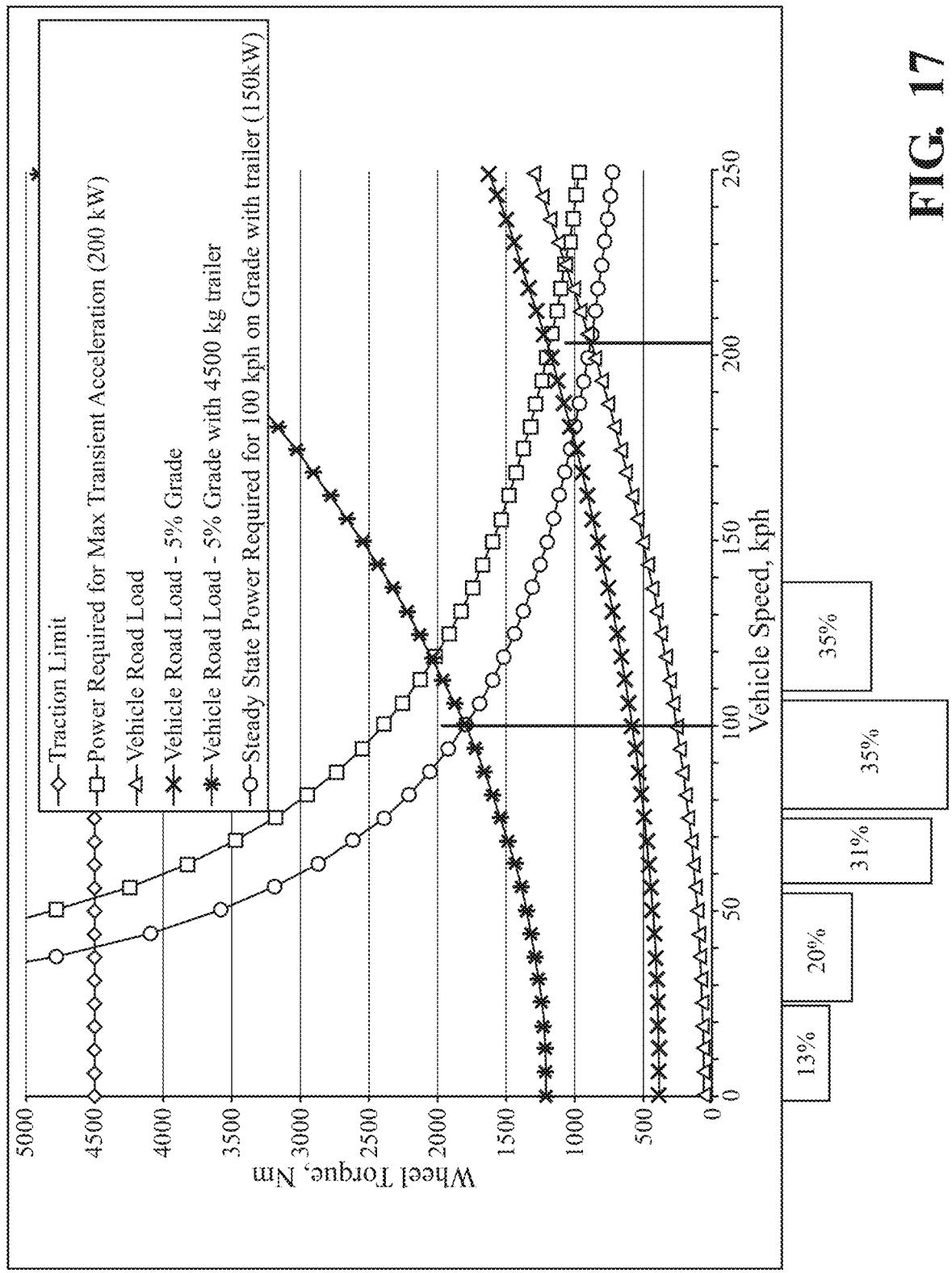
FIG. 17 is a chart illustrating various modes of operation of the vehicle based on various driving conditions.

FIG. 17 is a graph showing wheel torque as a function of vehicle speed. Additionally, various driving conditions are shown based on wheel torque as a function of vehicle speed. Additionally, below the x-axis, a percent of fuel used on the cycle based on vehicle speed.

Figure 18:
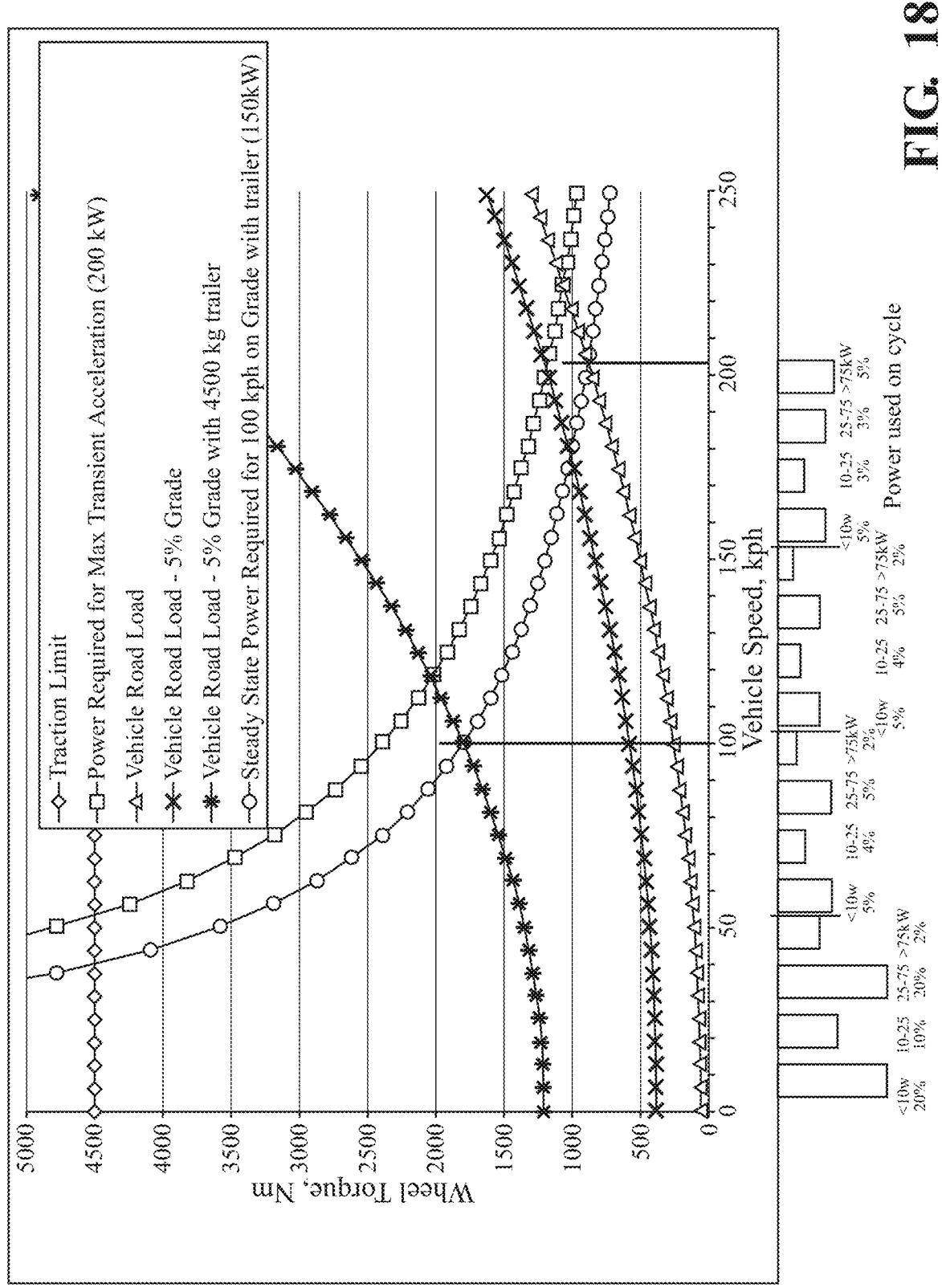
FIG. 18 is a chart illustrating various modes of operation of the vehicle based on various driving conditions.

FIG. 18 is the table of FIG. 17, with further information below the x-axis representing the power used (in kW) per cycle, which is broken into four groups along the x-axis.

FIG. 20 is a cross-section view of a conventional dual clutch transmission. In particular, the conventional dual clutch transmission includes a first and second countershaft 100, 102 (also referred to as an output shaft), a first and second input shaft 104, 106 (also referred to as an output shaft, which outputs rotational power to the countershaft), a first and second clutch 108, 110, a reverse shaft 112, and mechatronics 114. As described above in certain embodiments, the transmission system 40 is free of components shown in FIG. 21, such as the second countershaft, which results in a shorter and more compact transmission system.

Figure 21:
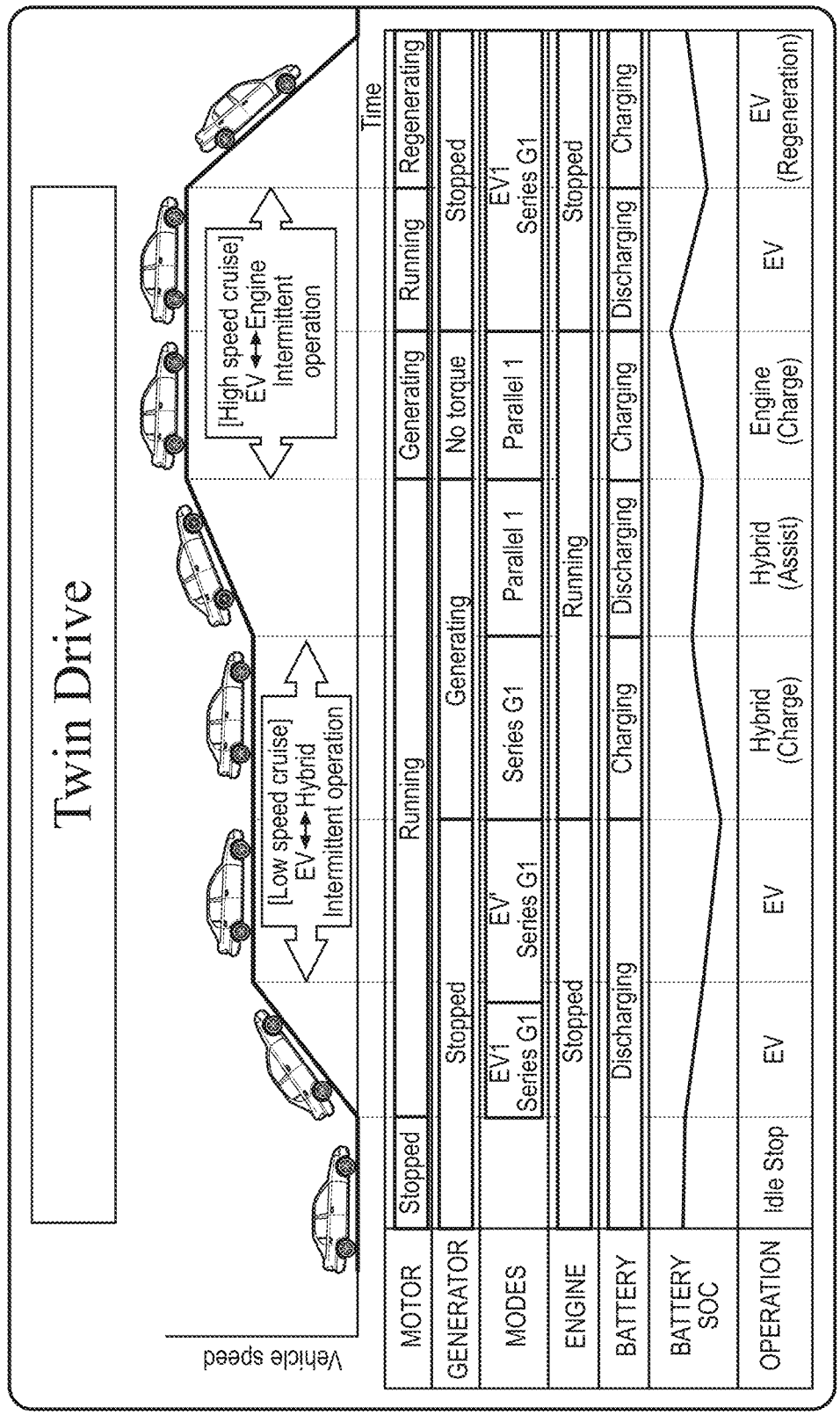
FIG. 21 is a table illustrating various modes of operation of a conventional hybrid vehicle.

FIG. 21 is an exemplary table of various driving modes of a conventional vehicle including an electric machine. In particular, FIG. 21 illustrates various driving conditions of a vehicle in which the internal combustion engine and/or the electric machine are used to propel the vehicle.

Figure 22:
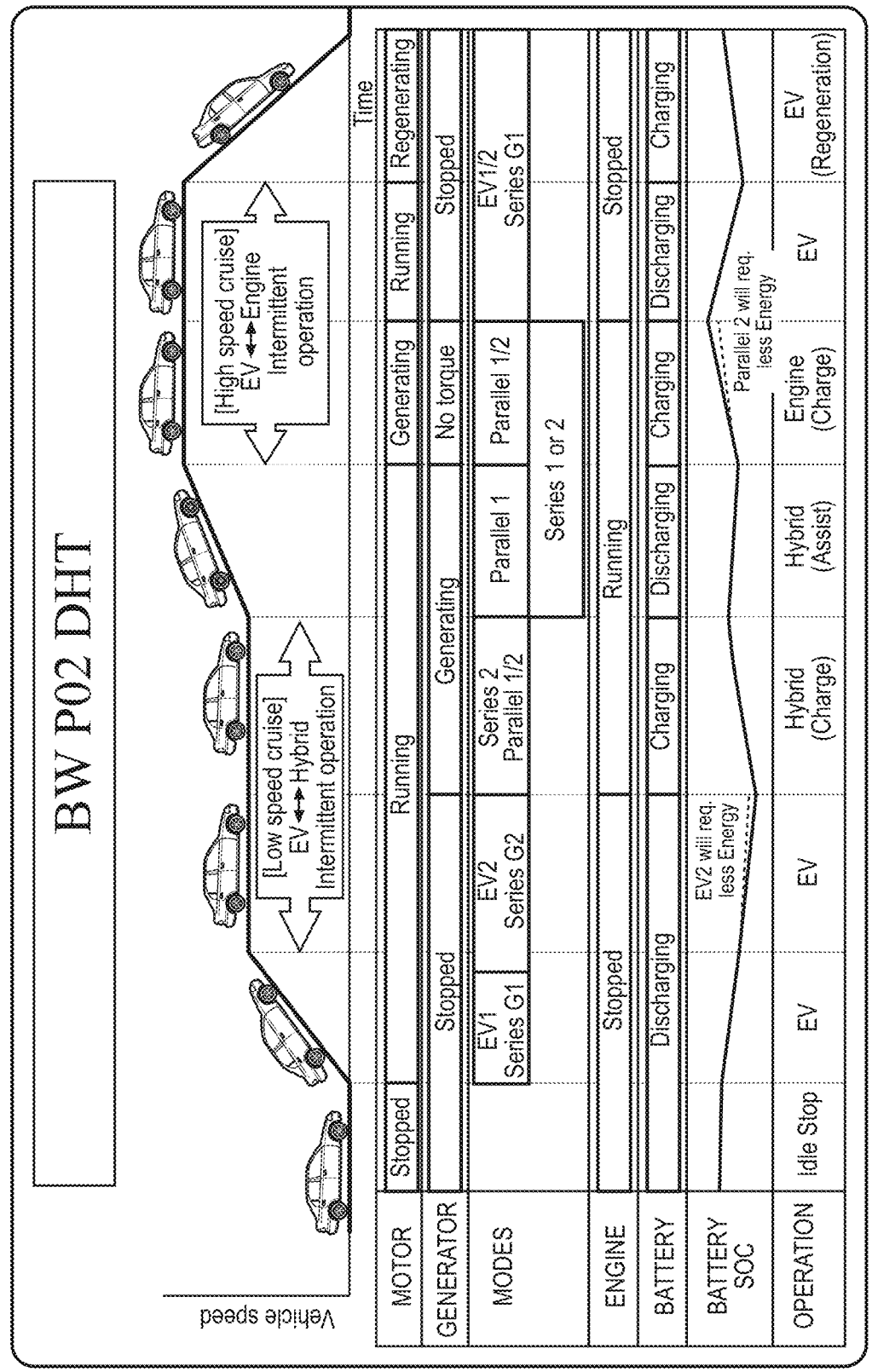
FIG. 22 is a table illustrating various modes of operation of the vehicle including the transmission system compared to various modes of operation of the conventional vehicle of FIG. 22.

FIG. 22 is an exemplary table of various driving modes of the vehicle 42 including the transmission system 40 as described above. It is to be appreciated that the EV (electric vehicle mode) may include embodiments in which the vehicle 42 includes the electric machine 72, or both the first and second electric machines 72, 82. As shown in FIG. 22, the vehicle 42 transitions between series modes and parallel modes. Even more particularly, along the "battery SOC" row, it is shown that while in the EV2 (using both first and second electric machines 72, 82) and series G2 (second gear), less energy is required to propel the vehicle 42. Furthermore, as shown in the generating column of the series 1 or 2 (i.e., first or second gear of the series mode of operation) and the parallel 1 or 2 modes (i.e., first or second gear of the parallel mode of operation), less energy is also required.

Figure 23:
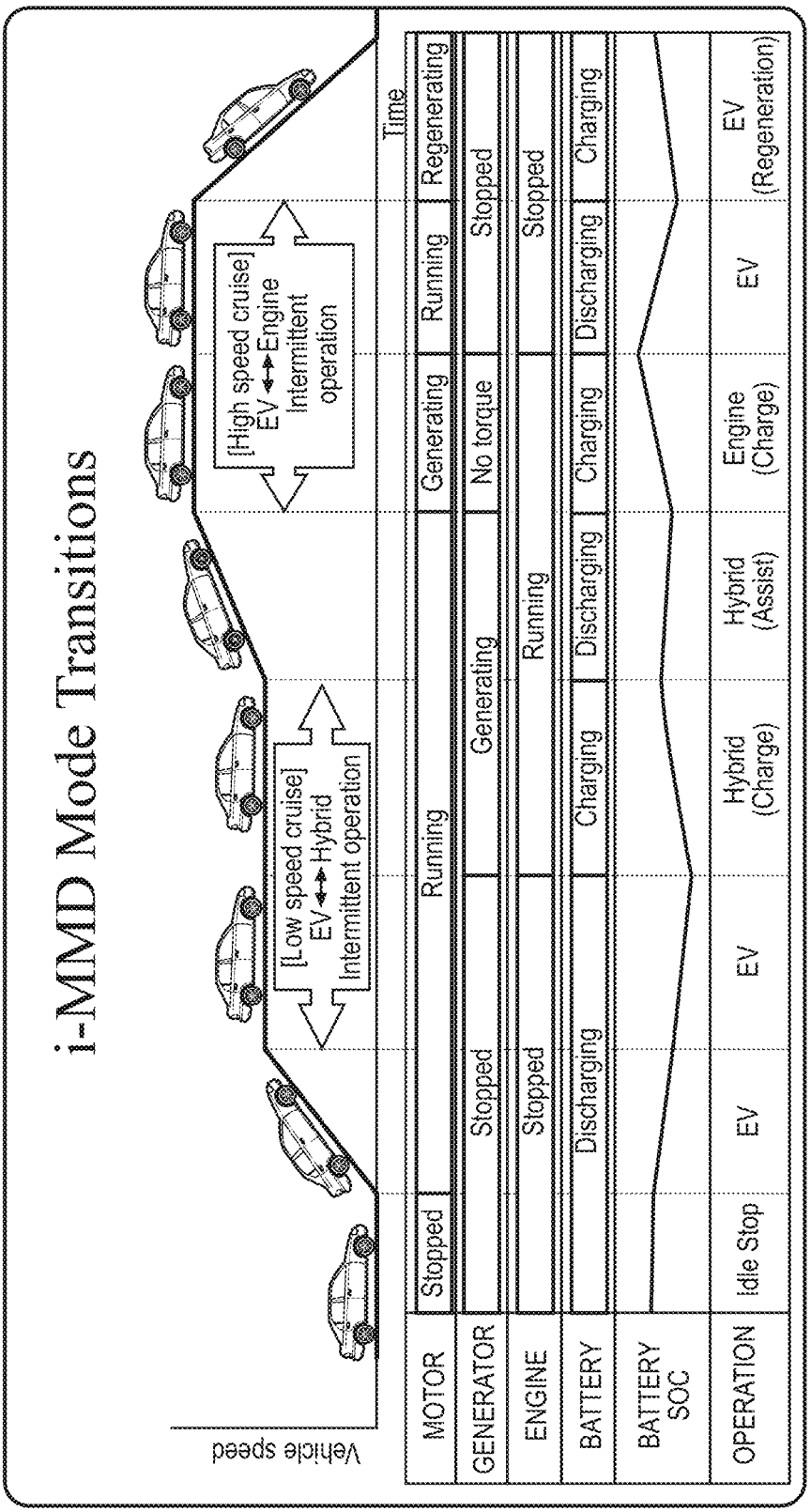
FIG. 23 is a table illustrating various modes of operation of a conventional hybrid vehicle.

FIG. 23 is an exemplary table of various driving modes of a conventional vehicle including an electric machine.

Figure 27:
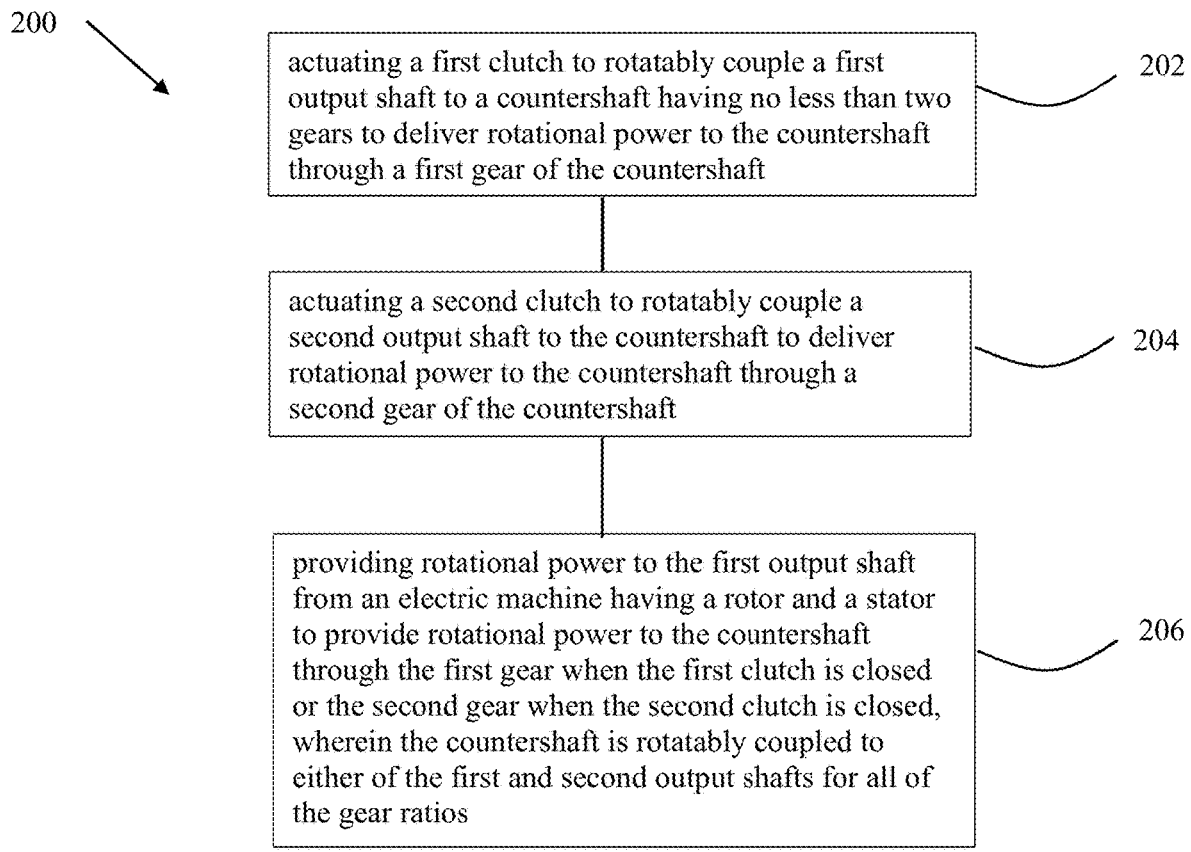
FIG. 27 is a flow chart of a method of controlling the transmission system of the vehicle.

A method 200 of controlling the transmission system 40 of the vehicle 42 includes the step of actuating the first clutch 64 to rotatably couple the first output shaft 60 to the countershaft 52 having no less than two gears 54 to deliver rotational power to the countershaft 52 through a first gear of the countershaft 52, as indicated by box 202 in FIG. 27. The method also includes the step of actuating the second clutch 66 to rotatably couple the second output shaft 62 to the countershaft 52 to deliver rotational power to the countershaft 52 through a second gear of the countershaft 52, as indicated by box 204. The method further includes the step of providing rotational power to the first output shaft 60 from the electric machine 72 having the rotor 74 and the stator 76 to provide rotational power to the countershaft 52 through the first gear when the first clutch 64 is closed or the second gear when the second clutch 66 is closed, wherein the countershaft 52 is rotatably coupled to either of the first and second output shafts 60, 62 for all of the gear ratios, as indicated by box 206 in FIG. 27. The transmission system 40 may be free of a second counter shaft. Typically, the countershaft 52 has no more than two gears.

The method may further include the step of providing rotational power to the countershaft 52 with the electric machine 72 and the internal combustion engine 44 of the vehicle 42. The transmission system 40 may include a disconnect clutch 80. In such embodiments, the method may include the step of actuating the disconnect clutch 80 to selectively couple the internal combustion engine 44 to the first or second output shaft 60, 62.

In one embodiment, the electric machine 72 is further defined as a first electric machine 72 and the transmission system 40 including a second electric machine 82, with the method further including the step of providing rotational power to the countershaft 52 with the first and second electric machines 72, 82. As described above, when rotational power is provided to the countershaft 52 from the first and/or second electric machines 72, 82, the vehicle 42 is in a series mode of operation.

In one embodiment, the step of providing rotational power to the countershaft 52 with the first and second electric machines 72, 82 is further defined as providing rotational power to the countershaft 52 with the first and second electric machines 72, 82 and the internal combustion engine 44. As described above, when rotational power is provided to the countershaft 52 from the first and/or second electric machines 72, 82, the vehicle 42 is in a parallel mode of operation.

What is claimed is:

1. A transmission system for use in a vehicle, said transmission system comprising:
    a transmission housing;
    a countershaft having no less than two gears, with said gears defining a plurality of gear ratios;
    a module housing coupled to said transmission housing, with said module housing defining a module housing interior;
    a first output shaft rotatably coupled to said countershaft;
    a second output shaft rotatably coupled to said countershaft;
    a first clutch disposed in said module housing interior, with said first clutch being configured to selectively rotatably couple said first output shaft to said countershaft to deliver rotational power to said countershaft;
    a second clutch disposed in said module housing interior, with said second clutch being configured to selectively rotatably couple said second output shaft to said countershaft to deliver rotational power to said countershaft; and
    an electric machine comprising a rotor and a stator, with said electric machine being configured to deliver rotational power to at least one of said first and second output shafts to deliver rotational power to said countershaft;
    wherein said countershaft is rotatably coupled to either of said first and second output shafts for all of said gear ratios; and
    further comprising a disconnect clutch disposed in said module housing interior, wherein said disconnect clutch is configured to selectively rotatably couple a crankshaft of an internal combustion engine or a second electric machine to at least one of said first and second output shafts; and
    wherein said first clutch and said second clutch are concentric with a common axis.

2. The transmission system as set forth in claim 1 being free of a second countershaft.

3. The transmission system as set forth in claim 2, wherein said countershaft has no more than two gears.

4. The transmission system as set forth in claim 1, wherein said countershaft has no more than two gears.

5. The transmission system as set forth in claim 1 being free of a synchronizer, a fork, a fork actuator, a fork sensing mechanism, and a rev-idler.

6. The transmission system as set forth in claim 1 comprising a series mode in which said electric machine or an internal combustion engine are configured to deliver rotational power to said countershaft, and a parallel mode in which said electric machine and the internal combustion engine are configured to deliver rotational power to said countershaft.

7. The transmission system as set forth in claim 1, wherein said electric machine is disposed in said module housing interior.

8. The transmission system as set forth in claim 1, wherein said first output shaft has a solid configuration, and wherein said second output shaft has a hollow configuration with said first output shaft disposed in said second output shaft.

9. The transmission system as set forth in claim 1, wherein said first and second output shafts extend along a shaft axis, wherein said electric machine extends along a machine axis, and wherein said shaft axis and said machine axis are axially aligned.

10. The transmission system as set forth in claim 1, wherein said first and second output shafts extend along a shaft axis, wherein said electric machine extends along a machine axis, and wherein said shaft axis and said machine axis are axially offset from one another such that said shaft axis and said machine axis are not axially aligned.

11. The transmission system as set forth in claim 1, wherein said electric machine is further defined as a first electric machine, and further comprising a second electric machine, and wherein said first and second electric machines are configured to selectively deliver rotational power simultaneously to said countershaft.

12. A method of controlling a transmission system of a vehicle, said method comprising the steps of:
actuating a first clutch to rotatably couple a first output shaft to a countershaft having no less than two gears to deliver rotational power to the countershaft through a first gear of the countershaft;
actuating a second clutch to rotatably couple a second output shaft to the countershaft to deliver rotational power to the countershaft through a second gear of the countershaft;
providing rotational power to the first output shaft from an electric machine having a rotor and a stator to provide rotational power to the countershaft through the first gear when the first clutch is closed or the second gear when the second clutch is closed;
wherein the countershaft is rotatably coupled to either of the first and second output shafts for all of the gear ratios; and
further comprising the step of providing rotational power to the countershaft with the electric machine and an internal combustion engine of the vehicle;
wherein the transmission system further comprises a disconnect clutch, and further comprising the step of actuating the disconnect clutch to selectively couple the internal combustion engine to the first or second output shaft; and
wherein the first clutch and the second clutch are concentric with a common axis.

13. The method as set forth in claim 12, wherein the transmission system is free of a second countershaft.

14. The method as set forth in claim 13, wherein the countershaft has no more than two gears.

15. The method as set forth in claim 12, wherein the countershaft has no more than two gears.

16. The method as set forth in claim 12, wherein the electric machine is further defined as a first electric machine and wherein the transmission system includes a second electric machine, and further comprising the step of providing rotational power to the countershaft with the first and second electric machines.

17. The method as set forth in claim 16, wherein the step of providing rotational power to the countershaft with the first and second electric machines is further defined as providing rotational power to the countershaft with the first and second electric machines and the internal combustion engine.

* * * * *